(12) United States Patent
Gapin et al.

(10) Patent No.: US 11,044,194 B2
(45) Date of Patent: *Jun. 22, 2021

(54) QOS FOR LATENCY-SENSITIVE NETWORK-TRAFFIC FLOWS

(71) Applicant: T-Mobile USA, Inc., Bellevue, WA (US)

(72) Inventors: Andrew Gapin, Seattle, WA (US); Paul Bongaarts, Issaquah, WA (US); Grant Morgan Castle, Bellevue, WA (US); Mallika Deshpande, Sammamish, WA (US); Kirti Krishnan, Sammamish, WA (US); Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/408,675

(22) Filed: May 10, 2019

(65) Prior Publication Data

US 2020/0280511 A1 Sep. 3, 2020

Related U.S. Application Data

(60) Provisional application No. 62/811,645, filed on Feb. 28, 2019.

(51) Int. Cl.
*H04L 12/725* (2013.01)
*H04L 29/08* (2006.01)

(52) U.S. Cl.
CPC .......... *H04L 45/302* (2013.01); *H04L 67/141* (2013.01)

(58) Field of Classification Search
CPC ........................... H04L 45/302; H04L 67/141
See application file for complete search history.

(56) References Cited

U.S. PATENT DOCUMENTS

2011/0047282 A1 2/2011 Denman et al.
2015/0237144 A1 8/2015 Miao et al.
(Continued)

FOREIGN PATENT DOCUMENTS

KR 20180123345 A 11/2018
WO WO2008070957 A1 6/2008

OTHER PUBLICATIONS

Burger, "A Session Initiation Protocol (SIP) Response Code for Rejected Calls", draft-ietf-sipcore-rejected-02, IETF, SIPCORE WG, Dec. 28, 2018, 22 pages.
(Continued)

*Primary Examiner* — Robert C Scheibel
(74) *Attorney, Agent, or Firm* — Lee & Hayes, P.C.

(57) ABSTRACT

A telecommunication system can include routing devices, a Quality of Service (QoS) controller, a policy-management device, and a flow-management device. The QoS controller or flow-management device can receive a request from a terminal to create a specialized flow (SF), e.g., for a non-audio, non-video media type. If the request is associated with an authorized user, a setup message can be sent comprising a QoS indicator. The system can create the SF permitting data exchange between the terminal and a routing device. The SF can have QoS characteristics associated with the QoS indicator. In some examples, the terminal can receive network-address information, determine an associated network resource, and send a flow-request message indicating a non-audio, non-video media type. The terminal can then exchange data on the network port with a peer network terminal.

19 Claims, 13 Drawing Sheets

(56) References Cited

U.S. PATENT DOCUMENTS

| | | |
|---|---|---|
| 2016/0330646 A1 | 11/2016 | Hu et al. |
| 2017/0303259 A1 | 10/2017 | Lee et al. |
| 2018/0199243 A1* | 7/2018 | Bharatia ............ H04W 36/0033 |
| 2018/0255594 A1 | 9/2018 | Liang et al. |
| 2018/0368038 A1 | 12/2018 | Reddiboyana et al. |
| 2019/0082417 A1* | 3/2019 | Bolle .................... H04W 88/14 |
| 2019/0124572 A1* | 4/2019 | Park .................. H04W 72/0446 |
| 2019/0335392 A1* | 10/2019 | Qiao ..................... H04W 48/18 |
| 2020/0204446 A1* | 6/2020 | Bongaarts ........... H04L 12/1403 |
| 2020/0214054 A1* | 7/2020 | Qiao ..................... H04W 48/18 |
| 2020/0236578 A1* | 7/2020 | Cakulev ................ H04W 28/24 |
| 2020/0260457 A1* | 8/2020 | Sun ........................... H04L 1/00 |
| 2020/0296221 A1* | 9/2020 | Zhou ................. H04M 15/8016 |

OTHER PUBLICATIONS

The PCT Search Report and Written Opinion dated Jun. 3, 2020 for PCT Application No. PCT/US2020/016342, 12 pages.

3GPP, "3rd Generation Partnership Project; Technical Specification Group Services and System Aspects, Study on Architecture for the Next Generation System, (Release 14)," 3GPP TR 23.799 v14.0.0, Dec. 2016, pp. 21-24.

3GPP, "3rd Generation Partnership Project; Technical Specification Group Services and System Aspects, System Architecture for the 5G System, Stage 2 (Release 15)," 3GPP TS 23.501 v15.1.0, Mar. 2018, pp. 19-23,73-75, 5.6.9, 87-100, 180-196.

3GPP, "3rd Generation Partnership Project; Technical Specification Group Services and System Aspects, Procedures for the 5G System, Stage 2 (Release 15)," 3GPP TS 23.502 v15.4.0, Dec. 2018, , pp. 54-56, 80-87, 93-104, 213-219, 231, 235-236.

3GPP, "3rd Generation Partnership Project; Technical Specification Group Radio Access Network, NG-RAN, NG Application Protocol (NGAP), (Release 15)," 3GPP TS 38.413 v1.0.0, Jun. 2018, pp. 18-22, 23-25, 29-30, 78-79, 112.

"AR, VR—Real-time Communications in 5G", Realtimecommunication.info, Sep. 14, 2018, 4 pages.

Callegari, et al., "Experimental Analysis of ViLTE Service", IEEE Access, vol. 6, Feb. 23, 2018, 11 pages.

"Differentiated Services", Wikipedia, Jul. 16, 2018, retrieved Jul. 23, 2018 from <<https://en.wikipedia.org/w/index.php?title=Differentiatied_services&oldid=850454519>>, 7 pages.

ETSI TS 123 060 V14.4.0, "Digital Cellular Telecommunications System (Phase 2+) (GSM); Universal Mobile Telecommunications System (UMTS); General Packet Radio Service (GPRS)", Jul. 2017, pp. 1, 279-282, 321-325, and 334-339.

ETSI TS 123 203 V14.5.0, "Digital Cellular Telecommunications System (Phase 2+) (GSM); Universal Mobile Telecommunications System (UMTS); LTE; Policy and Charging Contrl Architecture", Oct. 2017, pp. 18, 28-30, 35-39, and 47-55.

ETSI TS 123 228 v15.3.0, "Digital Cellular Telecommunications system (Phase 2+) (GSM), Universal Mobile Telecommunications System (UMTS), LTE, IP Multimedia Subsystem (IMS), Stage 2", Sep. 2018, pp. 315-321.

ETSI TS 123 401 V14.4.0, "LTE; General Packet Radio Service (GPRS) Enhancements for Evolved Universal Terrestrial Radio Access Network (E-UTRAN) Access", Jul. 2017, pp. 89-95, 109-113.

ETSI TS 123 503 v15.3.0, "5G, Policy and Charging Control Framework for the 5G System, Stage 2", Sep. 2018, pp. 13-20.

ETSI TS 124 008 V13.5.0, "Digital Cellular Telecommunications System (Phae 2+) (GSM); Universal Mobile Telecommunications System (UMTS); LTE; Mobile Rado Interface Layer 3 Specification", Apr. 2016, pp. 296-309, 431-432, 621-627.

ETSI TS 124 229 v15.4.0, "Digital Cellular Telecommunications system (Phase 2+) (GSM), Universal Mobile Telecommunications System (UMTS), LTE, 5G, IP Multimedia call control protocol based on Session Initiation Protocol (SIP) and Session Description Protocol (SDP), Stage 3", Nov. 2018,—pp. 177-197, 953-958.

ETSI TS 124 501 v15.1.0, "5G, Non-Access-Stratum (NAS) protocol for 5G System (5GS), Stage 3", Oct. 2018, pp. 182-188, 208-225, 274-276, 349-361.

ETSI TS 126 114 V15.3.0, "Universal Mobile Telecommunications Systems (UMTS); LTE; IP Multimedia Subsystem (IMS); Mulitmedia Telephony; Media Handling and Interaction", Jul. 2018, pp. 246-253.

ETSI TS 129 162 V14.2.0, "Digital Cellular Telecommunications System (Phase 2+) (GSM); Universal Mobile Telecommunications Systems (UMTS)", Apr. 2017, pp. 15-18.

ETSI TS 129 212 V15.3.0, "Universal Mobile Telecommunications System (UMTS); LTE; Policy and Charging control (PCC); Reference Points", Jul. 2018, pp. 38-39, 114-122, 136-139.

ETSI TS 129 213 V15.3.0, "Digital Cellular Telecommunications System (Phase 2+) (GSM); Universal Mobile Telecommunications System (UMTS); Policy and Charging Control Signaling Flows and Quality of Service (QoS) Parameter Mapping", Jul. 2018, pp. 14-22, 34-45, 93-119.

ETSI TS 129 214 V15.4.0, "Universal Mobile Telecommunications System (UMTS); LTE; Policy and Charging Control Over Rx Reference Point", Jul. 2018, p. 42.

ETSI TS 129 512 v15.1.0, "5G, 5G System, Session Management Policy Control Service, Stage 3", Oct. 2018, pp. 10-18, 30-31, 39-50.

ETSI TS 129 513 v15.1.0, "5G, 5G System, Policy and Charging Control Signalling Flows and QoS Parameter Mapping, Stage 3", Oct. 2018, pp. 45-63.

ETSI TS 129 514 v15.1.0, "5G,5G System, Policy Authorization Service, Stage 3", Oct. 2018, pp. 54-55, 60, 62-63.

ETSI TS 138 331 v15.2.1, "5G, NR, Radio Resource Control (RRC), Protocol Specificiations", Jun. 2018, pp. 18-19, 32-33.

ETSI TS 138 413 v15.1.0, "5G, NR-RAN, NG Application Protocol (NGAP)", Sep. 2018, pp. 19-25, 112.

Houshmand, M., "Policy Control Over the Rx Interface Using Diameter for VoLTE", Netmanias, Jan. 2, 2017, 8 pages.

"IMS-MGW and IMS-MGCF" Advantech, Apr. 26, 2012, retrieved May 22, 2015 from <<http://www.advantech-embedded.com/networks-communications/telecom?doc_id=%7b3b222ed1-6165-41ca-bf52-a2a12171faf>>, 2 pages.

"Integrated Services", Wikipedla, May 28, 2018, retrieved Jul. 23, 2018 from <<https://en.wikipedia.org/w/index.php?title=Integrated_services&oldid=843347119, 3 pages.

"Link Layer Discovery Protocol", Wikipedia, Nov. 1, 2017, retrieved Jul. 23, 2018 from <<https://en.wikipedia.org/w/index.php?title=Link_Layer_Discovery_Protocol&oldid=808179148>>, 4 pages.

Miracle, Rob., "Tutorial: Local Multiplayer with UDP/TCP", Corona Labs, Sep. 23, 2014, 13 pages.

"Quality of Service in LTE", IP Multimedia Subsystem University, Feb. 11, 2016, retrieved Aug. 28, 2018 from <<http://www.ims-university.com/blog/quality-of-service-in-lte>>, 9 pages.

Rosenberg, J. et al., "SIP: Session Initiation Protocol", Request for Comments 3261, Standards Track, Jun. 2002, pp. 35-36 and 46-47.

Rosenberg, J., et al., "An Offer/Answer Model with the Session Description Protocol (SDP)", Request for Comments 3264, Standards Track, Jun. 2002, pp. 5-12.

Handley, M., et al., "SDP: Session Description Protocol", Request for Comments 4566, Standards Track, Jul. 2006, pp. 22-23 and 33-38.

Sauter, "How to Get an IPv6 Prefix from the LTE Network", WirelessMoves blog, published Apr. 2016, 3 pgs.

Shepherd, "Learn About QoS in 5G Networks", found at www.linkedin.com/pulse/learn-qos-5g-networks-paul-shepherd, published Sep. 2018, 5 pgs.

Singh, "Session and Service Continuity Evolution in 5G Networks", located at http://4g5gworld.com/blog/session-and-service-continuity-evolution-5g-networks, Published Feb. 2019, 2 pgs.

"VoLTE End to End QoS Control", Red Mouse, Jun. 10, 2015, retrieved Jul. 23, 2018 from <<http://hongjoo71-e.blogspot.com/2015/06/end-to-end-qos-control-in-volte.html>>, 5 pages.

"VoLTE Service Description and Implementation Guidelines", GSMA, Version 2.0, Oct. 7, 2014, pp. 26-30, 35-39, 52-58, and 76-80.

(56) References Cited

OTHER PUBLICATIONS

"3GPP; TSG CT; PCC signalling flows and QoS parameter mapping (Release 15)", 3GPP TS 29.213 V15.4.0, Sep. 21, 2018, sections 6-7, 231 pages.
The PCT Search Report and Written Opinion dated Mar. 26, 2020, for PCT Application No. PCT/US2019/064243, 10 pages.

* cited by examiner

QOS FOR LATENCY-SENSITIVE NETWORK-TRAFFIC FLOWS

CROSS-REFERENCE TO RELATED APPLICATIONS

This application is a nonprovisional of, and claims priority to and the benefit of, U.S. Patent Application Ser. No. 62/811,645, filed Feb. 28, 2019, and entitled "Latency-Sensitive Network-Traffic Flow QoS," the entirety of which is incorporated herein by reference.

BACKGROUND

Modern telecommunications networks such as cellular telephone networks can support a variety of types of session, such as voice, video, or messaging. Second-generation (2G) and third-generation (3G) cellular networks such as Global System for Mobile Communications (GSM) networks or Universal Mobile Telecommunications System (UMTS) networks generally carry streaming media over circuit-switched (CS) connections. Fourth-generation (4G) cellular networks, such as Long Term Evolution (LTE) (including LTE-Advanced) networks, and fifth-generation (5G) cellular networks, generally carry streaming media over packet-switched (PS) connections. Those PS connections may also carry non-streaming types of data, e.g., file downloads. Many cellular networks are standardized by the Third-Generation Partnership Project (3GPP).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Overview

Figure 1:
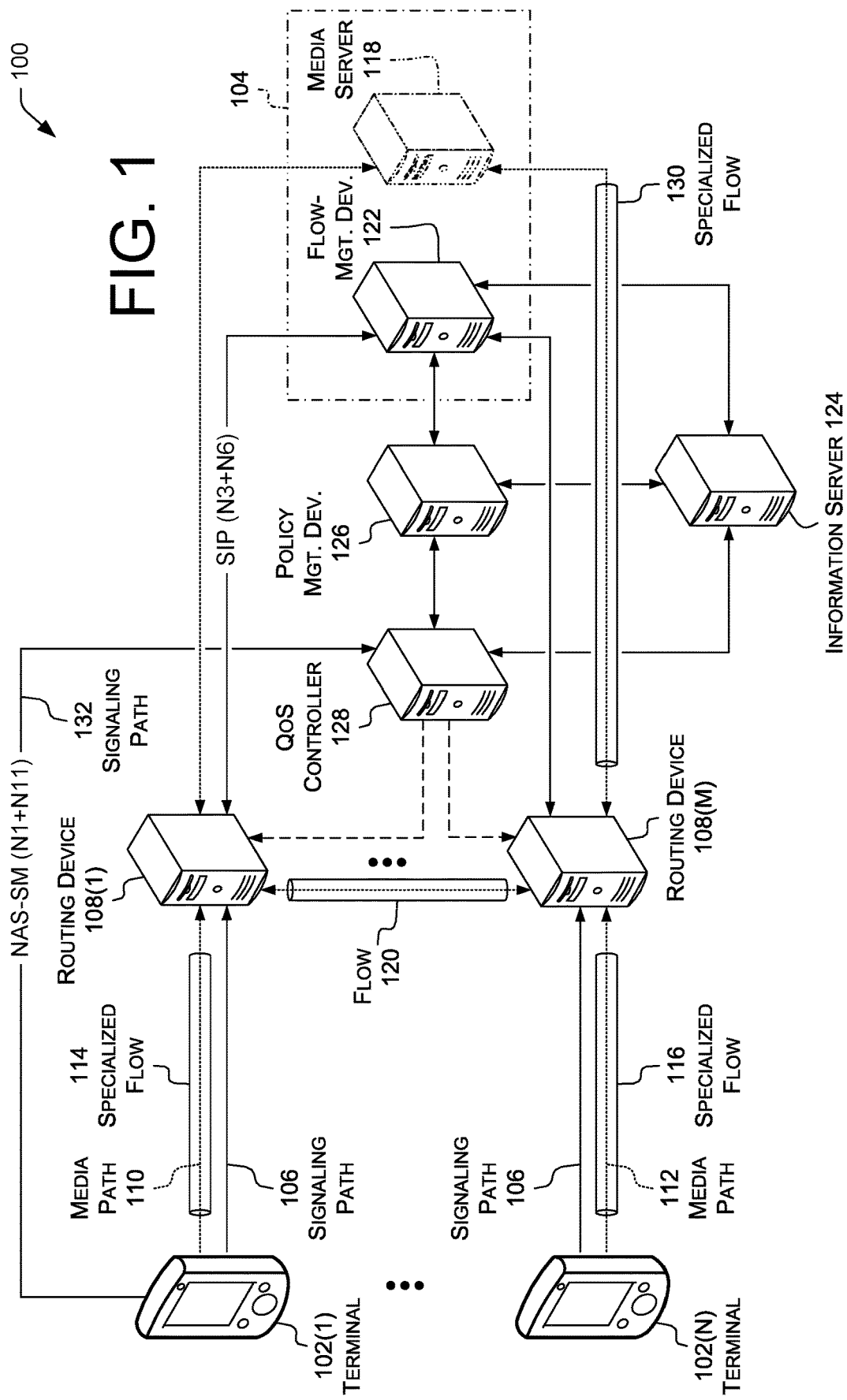
FIG. 1 illustrates an example telecommunications system providing specialized flows (SFs).

This disclosure describes, in part, a telecommunications network configured to provide improved QoS for latency-sensitive traffic that does not have a guaranteed bit rate (GBR). Such traffic can be carried by an appropriately-configured flow. A flow is an identified logical connection for conveying data in a manner determined by the flow. For example, a flow can have particular QoS or throughput (e.g., bits per second, bps) characteristics. A terminal can have one or more flows open concurrently via a single radio connection.

Some network traffic is latency-sensitive, for example, transmissions during a multiplayer computer-mediated competition, a remote-healthcare session (e.g., telesurgery), or remote operation of a vehicle. In some prior schemes, that traffic is routed in the same way as non-latency-sensitive network traffic, such as Web-browsing traffic. In some examples herein, low-latency network communications (e.g., cellular data communications) are provided for services that would not be able to access low-latency communication services in some prior schemes. In some examples herein, traffic to or from terminals associated with authorized users can be routed via specialized flows that have low-latency QoS parameters or other specialized QoS parameters (e.g., as discussed herein with reference to operation 618). An app on a terminal can request a network node to create such a flow, then use that flow to exchange information over a connection having lower latency than might otherwise be available.

Flow management according to some examples herein can include any of: creation of flows, termination of flows, assignment of flows to terminals or traffic flows, assignment of QoS parameters of flows, or selection of flows to carry particular types of traffic. Flow assignment or selection can be performed, e.g., when flows are created or terminated, or at handover or other changes of state of a terminal.

Flows can include one or more bearer(s), tunnel(s), or other network link(s). Examples of bearers can include, in 3GPP 5G New Radio (NR), signaling radio bearers (SRBs) or (user-plane) data radio bearers (DRBs) between the terminal and a gNodeB (3GPP 38.331 v15.2.1 § 4.4, § 5.3.5.6.4, and § 5.3.5.6.5). Bearers can be selected based on packet loss, delay budget, or other QoS criteria. Tunnels can include, e.g., an N3 tunnel between a radio access network (RAN) and a User Plane Function (UPF), an IPsec tunnel, a Proxy Mobile IP (PMIP) or PMIPv6 tunnel, or another network tunnel. Other network links can include, e.g., network links behind a firewall, e.g., within a carrier's core network, or network links to, from, or via an IP Packet eXchange (IPX) provider (GSMA IR.34). A flow via one or more network(s) between a first node or device and a second node or device can include or consist of other flows, each spanning part of a path through the network between the first node or device and the second node or device. For example, an end-to-end QoS flow between a terminal and a node can include DRB(s) from the terminal to a RAN, an N3/N9 tunnel from the RAN to a UPF, and other network links, e.g., across the public Internet, from the UPF to the node. In some examples, a PDU session carries traffic for a particular packet data network (PDN), e.g., the Internet or an IP Multimedia Subsystem (IMS), and that traffic includes multiple QoS flows, e.g., one for email and another for streaming video.

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can be a device that includes a user interface (e.g., as does a smartphone), or can be a device that does not include a user interface. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein include a communications path for bidirectional exchange of data among two or more terminals. Example sessions include voice and video calls, e.g., by which human beings converse; data communication sessions, e.g., between two electronic systems or between an electronic system and a user-interface device in use by a human being; or a Rich Communication Suite (RCS) session. Sessions can be carried, e.g., by cellular or data networks, e.g., LTE or IEEE 802.11 (WIFI). Other examples of networks are discussed below.

Some examples herein relate to low-latency traffic. Some examples herein relate to traffic other than audio or video traffic. Some examples herein relate to communications sessions involving the exchange of multiple types of data, e.g., voice, text, and state.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

Illustrative Telecommunications Networks and Components

FIG. 1 illustrates an example telecommunication system 100 and shows an overview of nodes and devices involved in provision of flow-management services to terminals. The telecommunication system 100 includes terminals 102(1)-102(N) (individually or collectively referred to herein with reference 102), N≥1. A terminal 102 may be or include a cellular phone or other type of terminal such as those described above.

Terminals 102 can be configured to initiate or receive communication sessions, such as a voice call, a video call, or another sort of synchronous communication. Initiation of such communications may involve communication clients and Session Initiation Protocol (SIP, RFC 3261) clients communicatively connected with components of the telecommunication system 100, e.g., components of an application network 104, e.g., an IMS network, the Internet or a subset thereof (e.g., a virtual private network, VPN), or another network providing services to terminal 102. The application network 104 can also be referred to as an "upper-level" network that uses the services provided by access networks (FIG. 2) to communicate with terminals 102. System 100 can include or be connected with any number of access networks or any number of application networks 104. In various embodiments, the application network 104 represents component(s) of an IMS core network.

Signaling messages are shown as being carried over signaling path 106, which can represent a dedicated signaling link (e.g., a Signaling System 7, SS7, link) or a flow of signaling data across a link shared with non-signaling traffic (e.g., ISUP over SIGTRAN, or non-ITU TCP/IP-family protocols such as SIP). SIP can be used to establish and manage communication sessions. SIP is an IP-based protocol, so terminal 102 exchanges SIP messages with components of application network 104 via signaling path 106 carrying IP packets. Such components can include, e.g., a proxy call session control function (P-CSCF) via which terminal 102 can access IMS services. Other signaling protocols can be additionally or alternatively be used, e.g., over Web Real-Time Communication (WebRTC) links. In some examples, application network 104 can include an H.323 multipoint control unit, and terminal 102 can exchange H.225.0 signaling messages with the control unit via signaling path 106, e.g., for multimedia conferencing.

Each terminal 102 can exchange non-signaling data (for brevity, "media") via at least one respective media path with routing device(s) 108. Shown are M routing devices 108(1)-108(M) (individually or collectively referred to herein with reference 108), M≥1. Terminal 102(1) exchanges media with routing device 108(1) via media path 110, and terminal 102(N) exchanges media with routing device 108(M) via media path 112. Routing devices 108 can in turn route the media to other terminals or network devices (omitted for brevity). Each terminal 102 is shown as attached to a respective routing device 108, but this is not limiting. In some examples, N=M; in some examples, N≠M. An individual routing device 108 can connect with any number ≥0 of terminals. In some examples, each terminal 102 is connected to either zero or one routing devices 108 at any given time. In some examples, at least one terminal 102 is connected to more than one routing device 108 concurrently.

In some examples, application network 104 provides voice-calling, video-calling, or data services. Application network 104 can provide different QoS levels to different services. In some examples of NR access networks, QoS levels are identified by NR 5G QoS Identifiers (5QIs). 5QIs can be used to define QoS for individual QoS flows. Each 5QI defines particular latency, packet priority, and packet-loss rate requirements. For example, an IMS core can interoperate with an NR access network to provide voice-over-NR (VoNR) data-transport services at 5QI 1, video-over-NR (ViNR) video data-transport services at 5QI 2, IMS signaling at 5QI 5, and non-GBR packet data at 5QI 6.

However, 5QI 6, in some prior schemes, permits latency of up to 300 ms. User(s) of two or more terminals 102 may wish to exchange non-GBR packet traffic, but without incurring the latency penalty of 5QI 6. In some examples, accordingly, the system 100 (or components thereof, and likewise throughout the discussion of this figure) establishes a specialized flow (SF) 114 between terminal 102(1) and routing device 108(1), and an SF 116 between terminal 102(N) and routing device 108(M). SF 114 carries media path 110, and SF 116 carries media path 112. The SFs provide predetermined QoS levels (e.g., associated with predetermined 5QIs or with signaled or derived QoS characteristics not represented by a predetermined 5QI) for packet data flows, such as media-packet flows associated with apps other than system dialers running on terminals 102. In some examples, the SFs 114, 116 provide a transparent connection to application network 104, e.g., including a media server 118 (shown in phantom), permitting low-latency traffic exchange with that application network 104. In some examples, media server is not a component of application network 104. In some examples, application network 104 facilitates communication between terminal(s) 102 and media server 118, e.g., by permitting establishment of SFs as described herein.

In some examples, multiple routing devices 108 can establish flows between themselves to carry traffic from SFs. In the illustrated example, routing devices 108(1), 108(M) can exchange traffic via flow 120. Terminals 102(1) can send low-latency media to terminal 102(N) via SF 114, flow 120, and SF 116, and vice versa. Flow 120 can be or include an SF or another type of packet flow. In some examples, traffic over flow 120 can carry a "differentiated-services indicator" (DSI) indicating or correlated with the QoS associated with SFs 114, 116, e.g., an IP Differentiated Services Code Point (DSCP) value. Examples of DSIs are described herein with reference to differentiated-services indicator 510.

In some examples, SFs 114, 116 are created on request of the respective terminals 102(1), 102(N). In some examples, a flow-management device 122, e.g., a P-CSCF or application server (AS) of an IMS network, receives requests to create SFs, e.g., a request from terminal 102(1) to create SF 114. The request can include, e.g., a SIP INVITE ("SIP"). The SIP INVITE can be carried by a 5G core ("N3+N6") over the N3 and N6 interfaces, and zero or more N9 interfaces, to the IMS application network 104. Flow-management device 122 determines that the request is associated with an authorized user, e.g., by exchanging messages with an information server 124. Information server 124 can include, e.g., a home location register (HLR)/home subscriber server (HSS), a Unified Data Management (UDM) function, or a Unified Data Repository (UDR) function.

After determining that the user is authorized, flow-management device 122 sends a setup message to a policy-management device 126, e.g., a Policy Control Function (PCF) node. Policy-management device 126 in turn requests a QoS controller 128 to interact with routing devices 108 to establish the SFs, e.g., SF 114. QoS controller 128 can be or include a Session Management Function (SMF) node of an NR core network. In some examples, policy-management device 126 can interact with information server 124 to verify the user's authorization instead of or in addition to flow-management device 122. In some examples, interactions such as those described above can additionally or alternatively be used to establish SF 130 between a routing device, e.g., routing device 108(M), and media server 118.

Various examples of flow-management device 122 and policy-management device 126 are discussed herein. In some examples, at least one of (e.g., one of, or both of) flow-management device 122 and information server 124 is a component of application network 104. For example, in the configuration shown, flow-management device 122 is a component of application network 104. In some examples, at least one of (e.g., one of, or both of) flow-management device 122 and information server 124 is not a component of application network 104.

In some examples, terminal 102(1) communicates with QoS controller 128 to create SFs instead of with flow-management device 122. An SMF is not part of application network 104. In some examples, terminal 102(1) can communicate with an SMF QoS controller 128 via an NR Access and Mobility Management Function (AMF) (omitted for brevity). For example, terminal 102(1) can send Non-Access Stratum (NAS) Session Management (NAS-SM) messages via signaling path 132 over the N1 reference point from terminal 102(1) to the AMF, and the AMF can forward those messages over the N11 reference point from the AMF to the SMF QoS controller 128 ("N1+N11"). The NAS messages can request QoS controller to create SF 114. QoS controller 128 can then send messages to the AMF, the routing device 108(1), or other nodes to cause setup of SF 114. In some examples, QoS controller 128 can interact with information server 124 to verify the user's authorization to create SFs.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include routing device(s) 108. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, by changing routing information, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Any of routing device(s) 108, flow-management device 122, information server 124, policy-management device 126, or node(s) of application network 104 can be or include a server or server farm, multiple, distributed server farms, a mainframe, a work station, a PC, a laptop computer, a tablet computer, an embedded system, or any other sort of device or devices. In one implementation, one or more of these may represent a plurality of computing devices working in communication, such as a cloud-computing node cluster. Examples of such components are described below with reference to FIG. 3.

Figure 2:
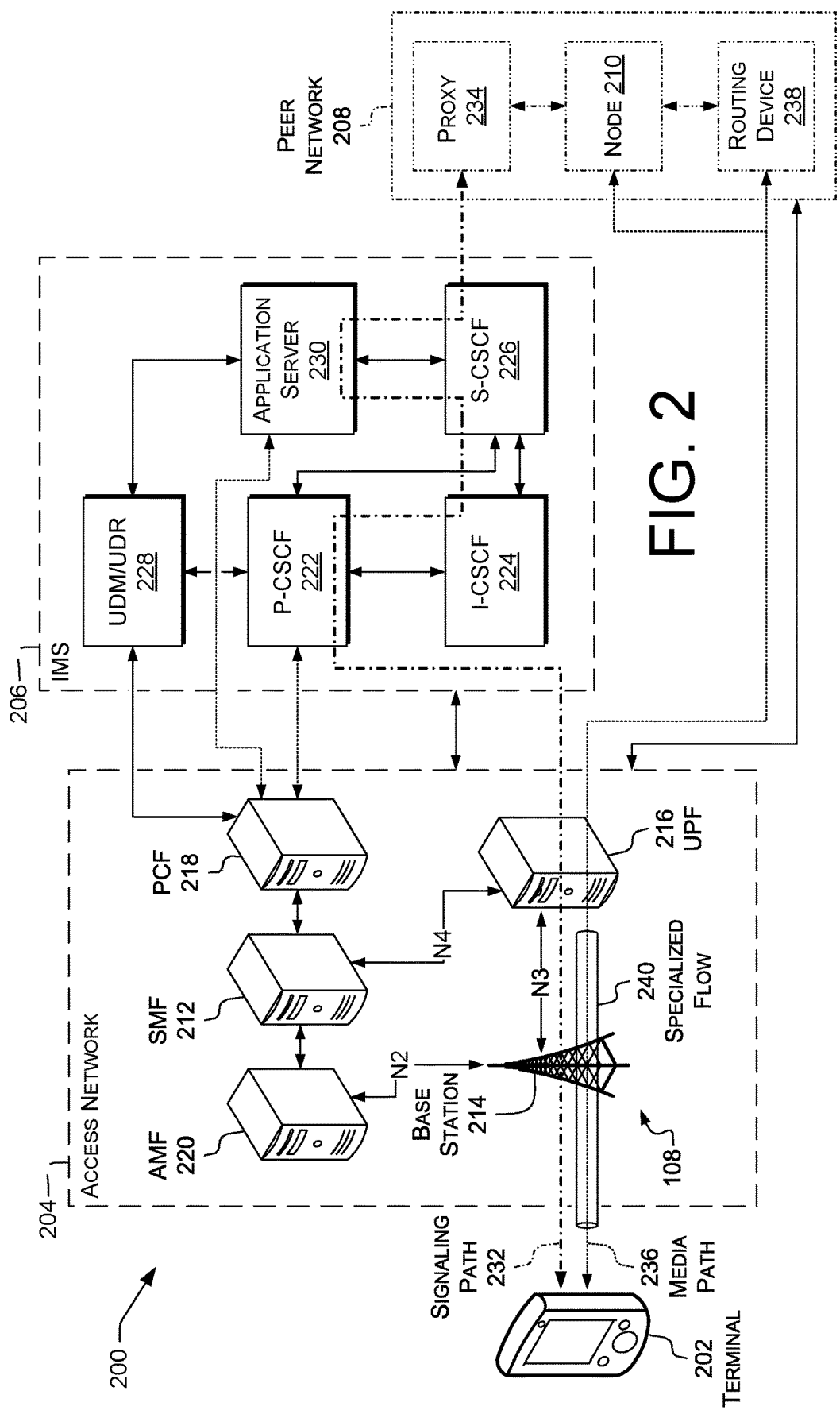
FIG. 2 illustrates an overview of nodes and devices involved in flow management for a terminal.

FIG. 2 illustrates an example telecommunication system 200 (which can represent system 100). Elements shown in FIG. 2 can represent corresponding elements shown in FIG. 1. Terminal 202, e.g., user equipment, communicates with access network 204 of the telecommunication system 200. Terminal 202 can carry out functions described herein with reference to, e.g., FIGS. 11-13. Access network 204 is shown as an NR access network. However, access network 204 can represent any type of access network including components performing functions described herein, e.g., a non-3GPP access network such as a WIFI network. In some examples, voice calls can be carried over access network 204 using VoNR or other Vo5G (voice over 5G) configurations, such as voice over LTE (VoLTE) in non-standalone (NSA) NR deployments.

IMS 206, which can represent access network 104, communicates with application network 204 and provides media-handling services, e.g., to route video or voice data.

For example, IMS 206 can provide services permitting terminal 202 to communicate with peer telecommunications network 208 (shown in phantom), e.g., with a node 210 thereof, such as a server or terminal. Peer network 208 can be operated by the same operator as IMS 206 or by a different operator. For example, IMS 206 and peer network 208 can be two IMSes operated by the same operator, or IMSes operated by respective, different operators. In some examples, peer network 208 is a PSTN or a 2G, 3G, or LTE cellular network. In some examples, peer network 208 is the Internet or another packet network.

In the illustrated example, access network 204 includes SMF 212, which can be an example of a QoS controller. Access network 204 includes a base station 214, e.g., an NR gNodeB base station, WIFI wireless access point (WAP), or other access point, that provides connectivity to access network 204. Base station 214 can represent a routing device 108. Access network 204 also includes an NR UPF 216, which can be an example of a packet gateway. UPF 216 can convey traffic between terminal 202 and networks outside access network 204, e.g., application network 104, IMS 206, or peer network 208. UPF 216 can represent a routing device 108.

Access network 204 also includes a PCF 218 (which can represent policy-management device 126), e.g., a server or other network device responsible for distributing policy information or interacting with policy-related network functions outside access network 204. Access network 204 can also include an AMF 220, which can represent an access controller or other device responsible for interfacing between a QoS controller (e.g., SMF 212) and a RAN. Access network 204 can include more than one of any of these components, or can include other components not shown.

In the illustrated example, IMS 206 includes a P-CSCF 222. IMS 206 also includes an interrogating CSCF (I-CSCF) 224, a serving CSCF (S-CSCF) 226, and a UDM/UDR 228. These components can perform functions described in 3GPP or other pertinent specifications. In some examples, P-CSCF 222 can additionally or alternatively perform functions described herein, e.g., with reference to FIGS. 3-10. For example, P-CSCF 222 can communicate with PCF 218 as described below. IMS 206 also includes an application server 230 configured to perform functions described herein, e.g., with reference to FIGS. 3-10. For example, AS 230 can communicate with PCF 218 as described below, or can provide network relaying services as described below. In some examples, the AS 230 is an anchoring network device and proxies signaling traffic for a communication session, e.g., operating as a SIP proxy or back-to-back user agent (B2BUA). The AS 230 (or other anchoring network device, and likewise throughout) can provide session-control services to terminal 202. The UDM/UDR 228 can communicate with P-CSCF 222, PCF 218, or AS 230, as shown, or with I-CSCF 224 or other illustrated components.

In the illustrated example, a signaling path 232 of a communication session passes through base station 214 and UPF (routing device) 216 in access network 204, and then through P-CSCF 222, I-CSCF 224, S-CSCF 226, and AS 230 in IMS 206, as indicated by the dash-dot arrow (in some other examples, I-CSCF 224 is omitted or bypassed). After AS 230, the example signaling path passes back through S-CSCF 226 to a network node of peer network 208, shown as a proxy 234. Proxy 234 can include, e.g., an S-CSCF, I-CSCF, or BGCF.

In the illustrated example, a media path 236 of the communication session passes through base station 214 and UPF 216 in access network 204. UPF 216 forwards the traffic to or from peer network 208. In the illustrated example, traffic between terminal 202 and peer node 210 is exchanged between UPF 216 and a peer routing device 238 of peer network 208.

Although peer network 208 and its components are shown in phantom, in some examples not depicted, at least one component of peer network 208 can be part of system 200. Moreover, in other examples not depicted, one or both of proxy 234 and peer routing device 238 may not be present. In some examples, peer network 208 is the Internet, node 210 is a non-IMS-connected device, and UPF 216 exchanges traffic directly with node 210. This can support low-latency use cases such as real-time messaging, computer-mediated competition, or over-the-top (OTT) video calling.

Data exchanges in computer-mediated competition or other network interactions can have a star topology, a mesh topology, or other topologies. In a star topology, each terminal 102, 202 interacts with a common media server 118 (e.g., node 210). In a mesh topology, at least one terminal 102, 202 exchanges data with another terminal 102, 202 without transferring that data by way of media server 118 or a similar device.

In the illustrated example, media path 236 between terminal 202 and UPF 216 is carried via SF 240. SF 240 can be or include, e.g., an NR QoS flow providing desired QoS characteristics, e.g., lower latency than traffic on a default NR QoS flow. SF 240 can include a DRB between terminal 202 and base station 214 and an N3 (or N3/N9) tunnel from base station 214 to UPFs 216 via zero or more intermediate UPFs (omitted for brevity). In some examples, SF 240 can have LTE 5QI 3.

The devices and networks illustrated in FIG. 2 can be examples of the devices and networks illustrated in FIG. 1 and described above. For instance, terminal 202 can represent a terminal 102; SMF 212 can represent QoS controller 128; UPF 216 can represent a routing device 108; P-CSCF 222, AS 230, or PCF 218 can represent flow-management device 122; PCF 218 can represent policy-management device 126; UDM/UDR 228 can represent information server 124; signaling path 232 can represent signaling path 106; or SF 240 can represent SF 114 or 116. Accordingly, the descriptions of the devices and networks of FIG. 1 apply to the devices and networks of FIG. 2. The devices and networks of FIG. 2 may cooperate to accomplish media routing, e.g., as shown in FIG. 1 and described herein. They may also cooperate to accomplish the initiation of a communication session of terminal 202. Techniques described herein with respect to originating communication sessions can also be used for receiving (terminating) sessions or for exchanging messages sent during an established phase of a communication session, in some examples.

Example cellular access networks 204 can include a GSM or UMTS network; a universal terrestrial radio network (UTRAN) or an GSM Enhanced Data rates for GSM Evolution (EDGE) radio access network (GERAN); an E-UTRAN (e.g., LTE); an Evolution-Data Optimized (EVDO), Advanced LTE (LTE+), Generic Access Network (GAN), Unlicensed Mobile Access (UMA), GPRS, EDGE, High Speed Packet Access (HSPA), or evolved HSPA (HSPA+) network. Example non-cellular access networks 204 can include a WIFI (IEEE 802.11), BLUETOOTH (IEEE 802.15.1), or other local-area network (LAN) or personal-area network (PAN) access networks, e.g., in the IEEE 802.1* family, a satellite or terrestrial wide-area access network such as a wireless microwave access (WIMAX) network, a wired network such as the PSTN, an optical network such as a Synchronous Optical NETwork (SONET), or other fixed wireless or non-wireless networks such as Asynchronous Transfer Mode (ATM) or Ethernet, e.g., configured to transport IP packets, e.g., IPv4, IPv6, or any other evolution of an IP-based technology.

In some examples, access network 204 can include a base station (e.g., an eNodeB or gNodeB), a radio network controller (RNC) (e.g., for UMTS access networks), or other elements. A cellular network or a wireless data network may use any sort of air interface, such as a code division multiple access (CDMA), time division multiple access (TDMA), frequency division multiple access (FDMA), or orthogonal frequency division multiple access (OFDMA) air interface.

The telecommunication system 200 may also include a number of devices or nodes not illustrated in FIG. 2. Nonlimiting examples of such devices or nodes include an Access Transfer Gateway (ATGW), a serving GPRS support node (SGSN), a gateway GPRS support node (GGSN), a session border controller (SBC), a visitor location register (VLR), an ISBC or IBCF, a BGCF, or a media gateway (MGW), LTE components such as a P-GW or an S-GW, or a non-3GPP-access interworking function (N3IWF). Similarly, throughout this disclosure, other nodes or devices can be used in conjunction with listed nodes or devices. For example, a telecommunications network can include many core network nodes or devices, only some of which implement functions described herein for core network nodes or devices. IMS 206 may further include a number of devices or nodes not illustrated in FIG. 2, such as a presence server and one or more additional CSCFs. A core network of the telecommunications network may be a GPRS core network or an evolved packet core (EPC) network, or may include elements from both types of core networks.

Figure 3:
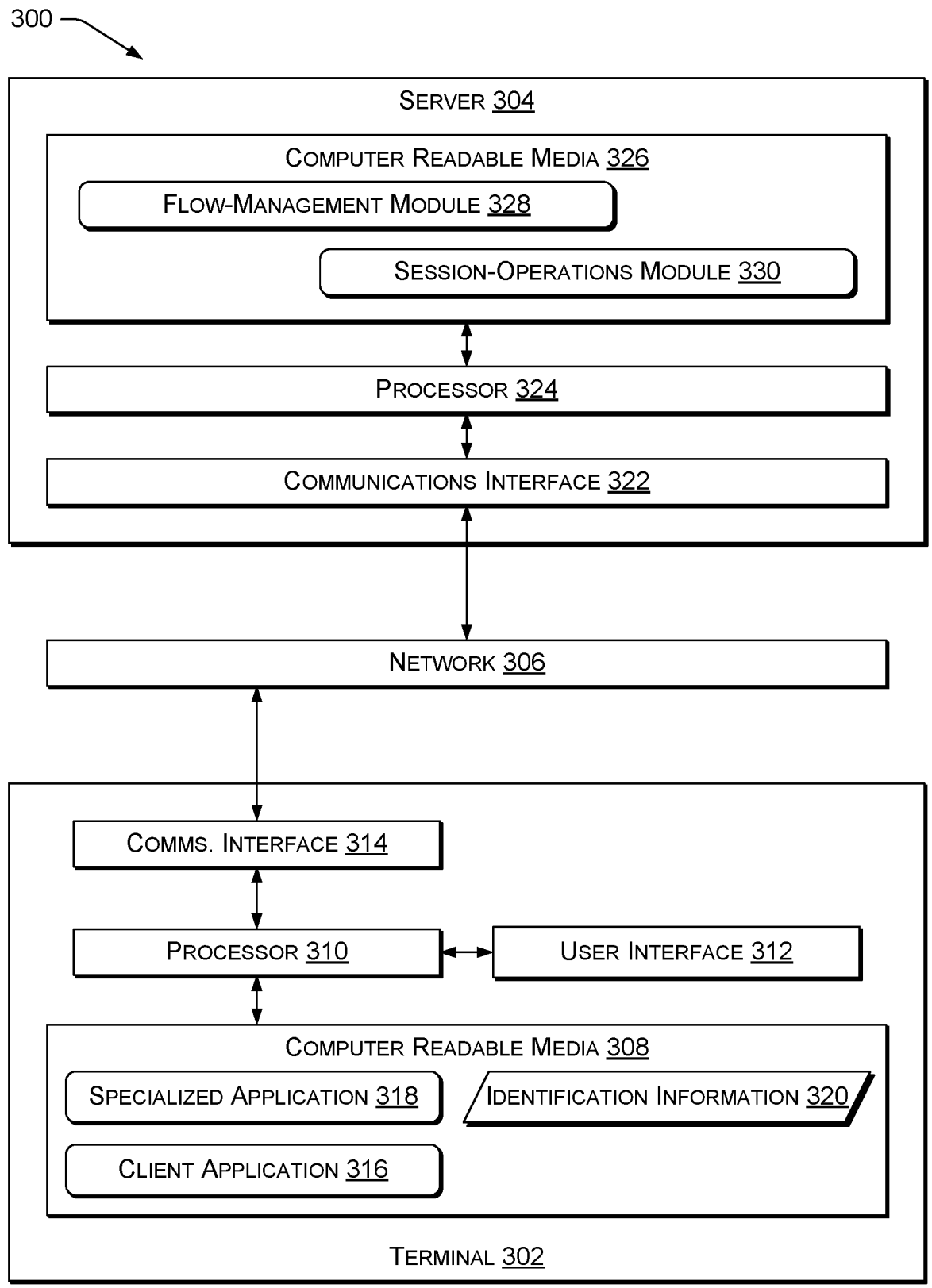
FIG. 3 is a block diagram illustrating components of a system that provides flow management according to some implementations.

FIG. 3 is a block diagram illustrating a telecommunication system 300 permitting media transport and flow management according to some implementations. The system 300 includes a terminal 302, e.g., a wireless phone or other terminal such as a terminal 102, 202, coupled to a server 304 via a network 306. The server 304 can represent a flow-management device 122 (e.g., P-CSCF 222), a policy-management device 126 (e.g., PCF 218), a QoS controller 128 (e.g., SMF 212), an information server 124 (e.g., UDM/UDR 228), an AMF 220, or another control device or information server of a telecommunications network.

The network 306 can include one or more networks, such as a cellular network and a data network. In some examples, network 306 may include any network configured to transport IP packets, e.g., IPv4, IPv6, or any future IP-based network technology or evolution of an existing IP-based network technology. For example, the network 306 can include one or more core network(s) (e.g., a 3GPP 5GC) connected to terminal(s) via one or more access network(s) (e.g., a 3GPP NG-RAN or other access network 204).

Terminal 302 can include one or more computer readable media (CRM) 308, such as memory (e.g., random access memory (RAM), solid state drives (SSDs), or the like), disk drives (e.g., platter-based hard drives), another type of computer-readable media, or any combination thereof. Terminal 302 can include one or more processors 310 configured to execute instructions stored on CRM 308. The CRM 308 can be used to store data and to store instructions that are executable by the processors 310 to perform various functions as described herein. The CRM 308 can store various types of instructions and data, such as an operating system, device drivers, etc. The processor-executable instructions can be executed by the processors 310 to perform the various functions described herein.

The CRM 308 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 310. Tangible computer-readable media can include volatile and nonvolatile, removable and non-removable media implemented in any method or technology for storage of information, such as computer readable instructions, data structures, program modules, or other data.

Processor(s) 310 can include, e.g., e.g., one or more processor devices such as central processing units (CPUs), microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). For brevity, processor 310 and, if required, CRM 308, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 324 and, if required, CRM 326, discussed below. Accordingly, functions described as carried out by processor(s) 310 in response to instructions stored on a CRM 308 can additionally or alternatively be performed by a control unit configured to perform functions described herein without reading instructions to do so from CRM 308.

For brevity, discussions of functions performed "by" module(s) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s).

Terminal 302 can further include a user interface (UI) 312, e.g., including an electronic display device, a speaker, a vibration unit, a touchscreen, or other devices for presenting information to a user and receiving commands from the user, e.g., under control of processor(s) 310. Terminal 302 can further include one or more communications interface(s) 314 configured to selectively communicate (wired or wirelessly) via the network 306, e.g., via an access network, under control of the processor(s) 310.

CRM 308 can include processor-executable instructions of a client application 316. The client application 316, e.g., a native or other dialer, can permit a user to originate and terminate communication sessions associated with the terminal 302, e.g., a wireless phone. The client application 316 can additionally or alternatively include an SMS, RCS, or presence client, or a client of another telephony service offered by the server 304. The client application 316 can additionally or alternatively include an app a Web browser configured to communicate via WebRTC or other non-3GPP protocols.

Figure 11:
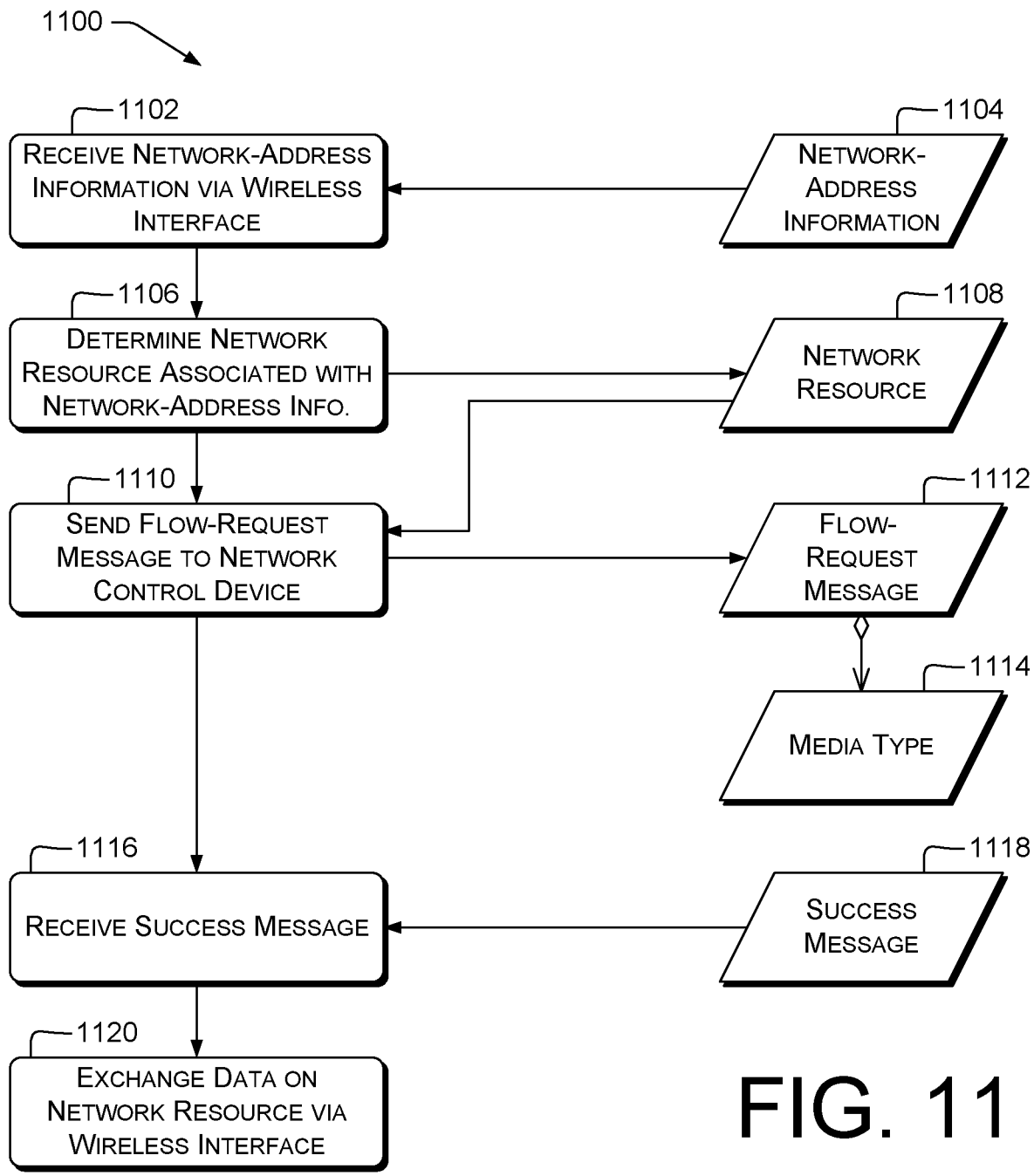
FIG. 11 illustrates an example process for communicating via a specialized flow.
Figure 12:
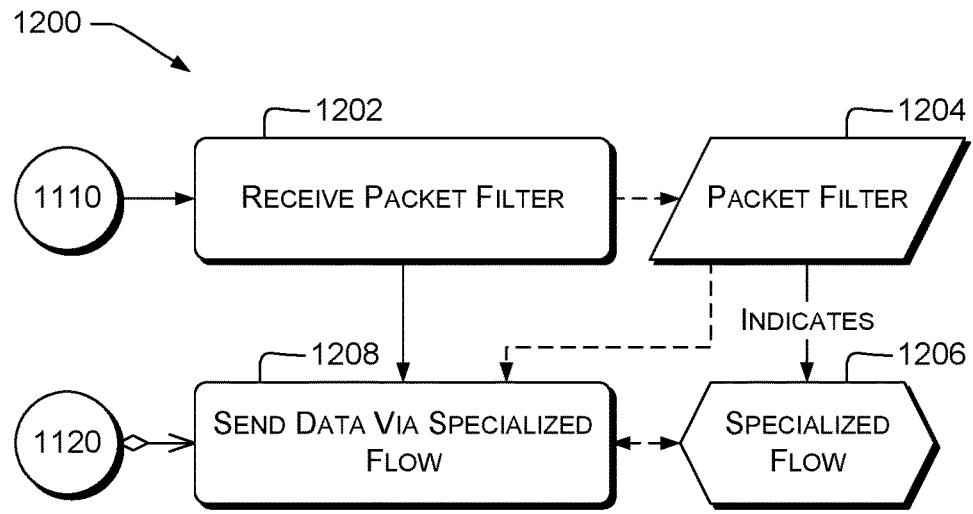
FIG. 12 illustrates an example process of sending data via a specialized flow.
Figure 13:
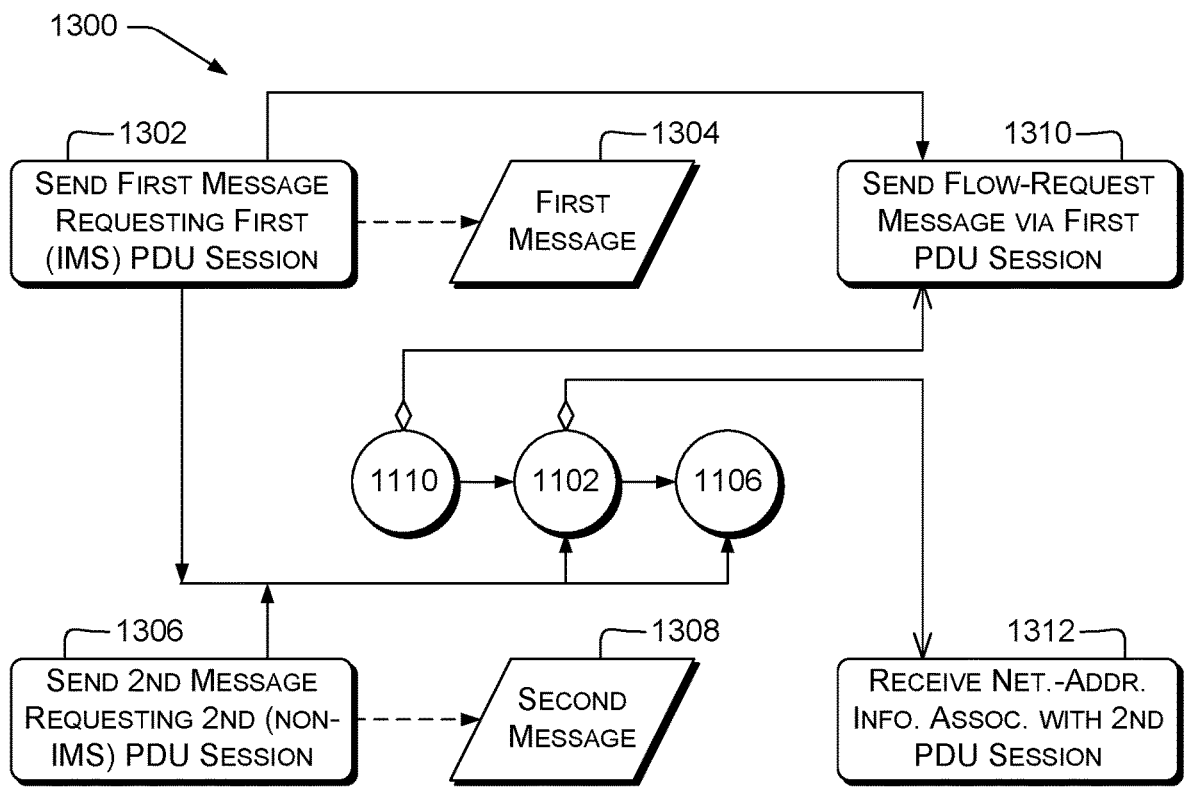
FIG. 13 illustrates an example process of requesting a specialized flow.

CRM 308 can additionally or alternatively store processor-executable instructions of a specialized application 318, e.g., a smartphone app or other program that, when executed by processor 310, requests or communicates via specialized flows (SFs) as described herein, e.g., with reference to FIGS. 11-13. Specialized application 318 is referred to subsequently, for brevity and without limitation, as an "app."

CRM 308 can additionally or alternatively store identification information 320 associated with terminal 302 or a user thereof. For example, CRM 308 can include a subscriber identity module (SIM) card storing, as at least part of identification information 320, an International Mobile Subscriber Identity (IMSI), a Mobile Subscriber International Subscriber Directory Number (MSISDN), a username, an e-mail address, a Subscriber Permanent Identifier (SUPI), a Permanent Equipment Identifier (PEI), a 5G Globally Unique Temporary Identifier (5G-GUTI), or another type of identification information.

In some examples, server 304 can communicate with (e.g., is communicatively connectable with) terminal 302 or other devices via one or more communications interface(s) 322, e.g., network transceivers for wired or wireless networks, or memory interfaces. Example communications interface(s) 322 can include ETHERNET or FIBRE CHANNEL transceivers, WIFI radios, or DDR memory-bus controllers (e.g., for DMA transfers to a network card installed in a physical server 304).

The server 304 can include one or more processors 324 and one or more CRM 326. The CRM 326 can be used to store processor-executable instructions of a flow-management module 328 and a session-operations module 330. The processor-executable instructions can be executed by the one or more processors 324 to perform various functions described herein, e.g., with reference to FIGS. 3-10. In some examples, server 304 can be configured to, e.g., by executing the processor-executable instructions, perform functions described herein with reference to FIGS. 3-10.

Illustrative Operations

Figure 4A:
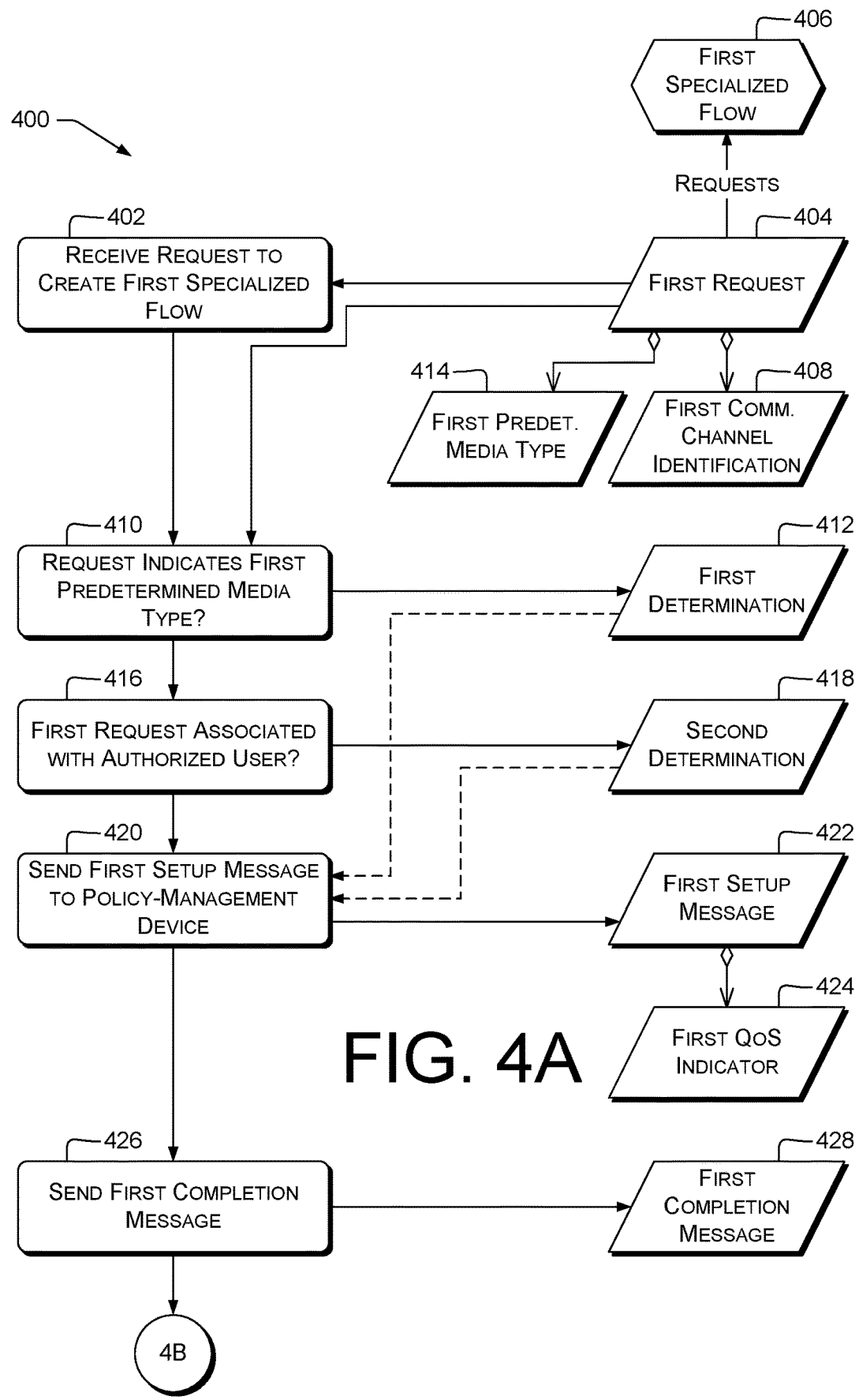
FIG. 4A illustrates a portion of an example flow-management process performed in a telecommunications network.
Figure 4B:
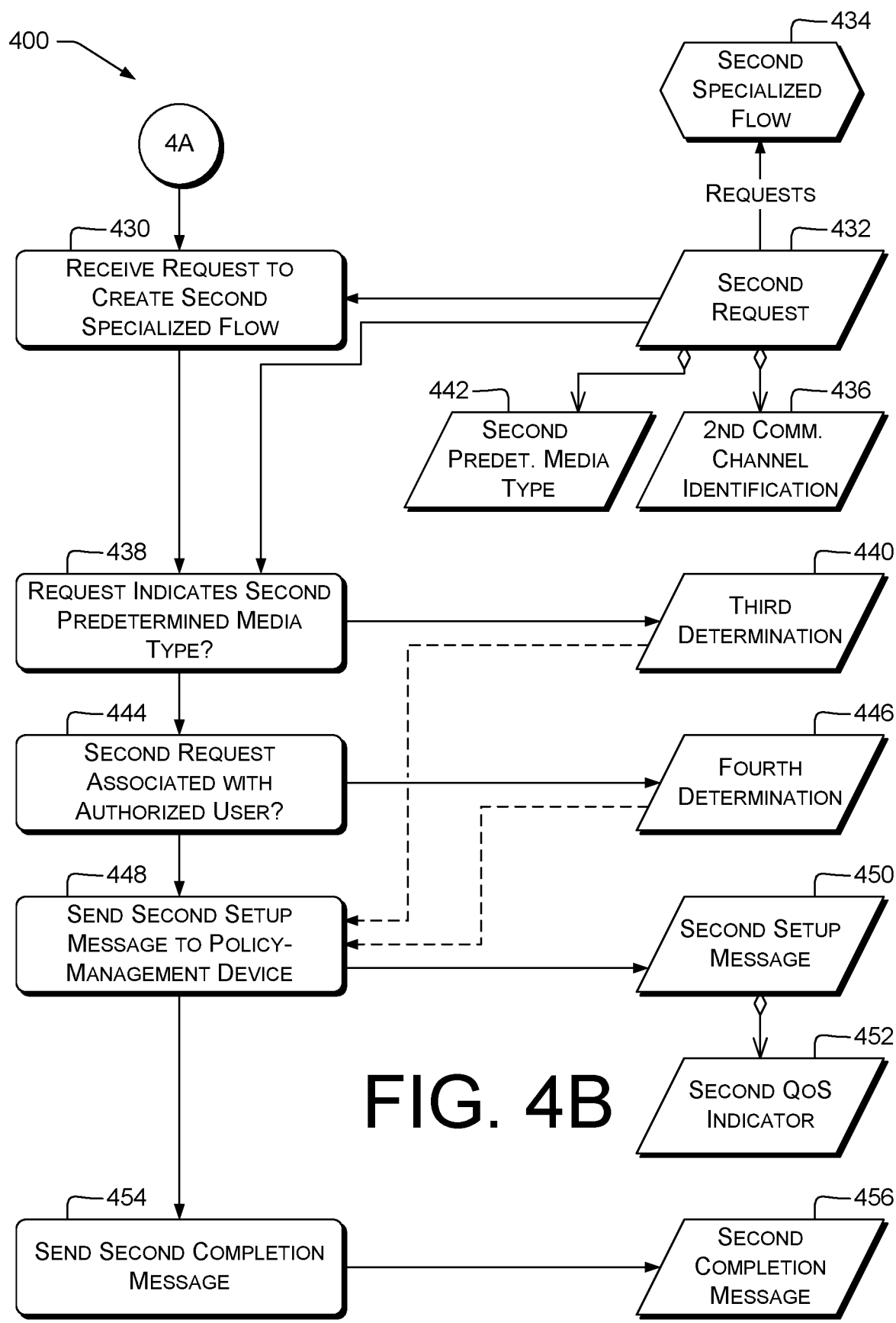
FIG. 4B illustrates another portion of the example flow-management process of FIG. 4A.

FIGS. 4A and 4B are dataflow diagrams together illustrating an example process 400 for flow management (e.g., creation), and related data items. Process 400 can be performed, e.g., by a control device such as a server 304 of a telecommunication system 300, e.g., including communications interface 322 and at least one processor 324. Server 304 can be or include, e.g., a flow-management device 122 such as P-CSCF 222 or a QoS controller 128 such as SMF 212. In some examples, the server 304 includes control unit(s) configured to perform operations described below, e.g., in response to computer program instructions of the flow-management module 328 or the session-operations module 330. For example, operations 426 and 454 can be performed by (e.g., in response to instructions of, as noted above) the session-operations module 330 and the remaining operations can be performed by the flow-management module 328. Alternatively, all the operations of process 400 can be performed by the flow-management module 328.

Process 400 can be performed by flow-management device 122 or QoS controller 128 communicatively connectable with one or more routing devices 108, e.g., UPF 216, and in some examples with a policy-management device 126. Process 400 can include providing services to one or more terminals 302, e.g., connected to one or more routing devices 108. In some examples, the one or more routing devices 108 are configured to convey traffic between a first SF 406 and a second SF 434, both discussed below. Some examples of process 400 can be carried out by a system comprising a control device and at least one of: a routing device, a policy-management device 126, or a QoS controller 128.

Operations shown in FIG. 4 and in FIGS. 5-13, discussed below, can be performed in any order except when otherwise specified, or when data from an earlier step is used in a later step. For clarity of explanation, reference is herein made to various components shown in FIGS. 1-3 that can carry out or participate in the steps of the example methods. It should be noted, however, that other components can be used; that is, example method(s) shown in FIGS. 4-13 are not limited to being carried out by the identified components, and are not limited to including the identified operations or messages.

Some operations herein are mutually independent, i.e., neither requires as input any output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

At 402, the control unit can receive, from a first network terminal 102 (or 202, 302, and likewise throughout this discussion) via a communications interface, a first request 404 to create a first SF 406 (flows are depicted using hexagons throughout FIGS. 4-13). The first request 404 can identify a first communication channel. For example, the first request 404 can include identification 408 of the first communication channel. In some examples, the first request can be or include a SIP INVITE request, a NAS session modification request, or another SIP or non-SIP request. The identification 408 can include, e.g., a network prefix, interface identifier, address, port, or address/port pair; a peer address, port, or address/port pair; a unique identifier; an address or other identifier of a multicast group; a domain name; or a Uniform Resource Identifier (URI), e.g., a tel: URI. In some examples, the identification 408 is not an identifier of a party reachable via Vo5G or Vi5G from the server 304. In some examples, the identification 408 is not an identifier of a party reachable via Vo5G or Vi5G from the first network terminal 102, 202, 302. In some examples, identification 408 can be shared among multiple users who desire to exchange low-latency traffic. In some examples, identification 408 is human-readable or -expressible, so that multiple users can communicate identification 408 amongst each other, e.g., verbally or in writing. For example, identification 408 can be expressed as a string of at most n characters, e.g., n=8, 10, 16, 20, 32, or 64; as a string of words using, e.g., the PGP word list; or as a series of at most n numbers, e.g., n=4, 5, 6, 8, or 10.

At 410, the control unit can make a first determination 412 that the first request 404 indicates a first predetermined media type 414. Solely for brevity hereafter, "mtype" is used as an abbreviation for "predetermined media type." For example, the control unit can locate data in first request 404 indicating the first mtype 414. The control unit can then compare the data to a stored list of one or more mtypes, and store data of the first determination 412 indicating that the first mtype 414 is found in the stored list.

The data in first request 404 can include, e.g., a header, a header-field value (e.g., a value of a SIP Content-Type header), or a body element. A body element can include, e.g., an SDP m=line, or the value thereof, the value in an Rx-interface (Diameter) Media-Type AVP (3GPP TS 29.214 v15.4.0 § 5.3.19), or the value in an NR Npcf_PolicyAuthorization MediaType enumeration (3GPP TS 29.514 v15.1.0 § 5.6.3.3). In some examples, the first mtype 414 is not an audio media type, and the first mtype 414 is not a video media type. For example, the first mtype 414 can include an SDP m=media description type other than "audio" or "video"; the first mtype 414 can include an Rx Media-Type AVP other than AUDIO or VIDEO; or the first mtype 414 can include an Npcf_PolicyAuthorization MediaType other than "AUDIO" or "VIDEO".

In some examples, the first mtype 414 can be, e.g., a predetermined value associated with low-latency traffic, e.g., an SDP m=line value of "zephyr" or "fast-data"; a SIP Content-Type of "application/fast-data"; an Rx Media-Type value of 42 (or another predetermined value between 7 and 0xFFFF_FFFE, inclusive), or an Npcf MediaType of "MIKE OLDFIELD". In some examples, first mtype 414 has a value different from any or all of: the media values listed in RFC 4566 § 8.2.1 (SDP "media" values), the values listed in in 29.214 § 5.3.19 for the Media-Type AVP, and the values listed in 29.514 Table 5.6.3.3-1 for the MediaType enumeration.

At 416, the control unit can make a second determination 418 that the first request 404 is associated with a first authorized user. Operations 416 and 410 are mutually independent. For example, the first request can include user information, e.g., a SIP From: header value, a source IP address or address/port combination, an IMSI, a SUPI, or another identifier of a user associated with terminal 102. The control unit can retrieve, from information server 124, authorization information associated with the user information. For example, the control unit can query the information server 124 via Diameter to retrieve an AVP indicating whether the user is authorized to create the first SF 406.

In some examples, the control unit is a control unit of SMF 212 or another QoS controller 128. In some of these examples, operation 416 can include retrieving information or requesting authorization from PCF 218 or another policy-management device 126. For example, SMF 212 can request PCF 218 authorization for a first request 404 to create, in a particular PDU session, a QoS flow having QoS characteristics that are not the default QoS characteristics for that PDU session.

Some prior schemes, such as some VoLTE implementations, do not apply user-based service-authorization control to SIP requests at the P-CSCF or other flow-management device 122. These schemes permit any SIP-connected user to send SIP requests, e.g., to the IMS Data Network Name (DNN), via a terminal 102 known to information server 124 and registered with flow-management device 122. By contrast, some examples using operation 416 permit controlling access to SFs. This can increase network robustness by reducing the chance that too many SFs will be requested or used concurrently.

At 420, the control unit can send a first setup message 422 via the communications interface. The control unit can send the first setup message 422 to a policy-management device 126 such as PCF 218, e.g., in some examples in which process 400 is carried out by a flow-management device 122. The control unit can send the first setup message 422 to AMF 220 or another access controller, e.g., in some examples in which process 400 is carried out by a QoS controller 128 such as SMF 212. The control unit can perform operation 420 in response to the first determination 412 and to the second determination 418. The first setup message 422 can request establishment of the first SF 406.

The first setup message 422 can include a first QoS indicator 424. The first QoS indicator 424 can include, e.g., 5QI, signaled QoS parameters, or information from a P-CSCF that the PCF or SMF can use to determine the QoS. Information used to determine the QoS can include, e.g., information of codecs or media types, such as first mtype 414. Examples of QoS parameters are discussed herein with reference to operation 618.

In some examples, the first setup message 422 (e.g., from flow-management device 122 to policy-management device 126) includes an Rx Diameter AA-Request (AAR) message carrying a Media-Type or QoS-Information AVP associated with the requested low-latency traffic characteristics. In some examples, the AAR can include information directly indicating an NR 5QI (or other QoS parameters for first SF 406), e.g., a QoS-Class-Identifier AVP. In some other examples, the AAR can include information the policy-management device 126 will use to determine the 5QI (or other QoS parameters). In some examples using 5QIs, the 5QI can be an operator-specific value or a spare value. For example, the first QoS indicator 424 can indicate a 5QI E {13, 14, 15, 18-64, 67, 68, 71-74, 76-78, 81, 81-127, 128-254}; or a 5QI in the range 128-254 (3GPP TS 23.501 v15.1.0 § 5.7.4).

In some examples, the first setup message 422 (e.g., from flow-management device 122 to policy-management device 126) includes an Npcf (N5) message including data of a first QoS indicator. For example, the first setup message 422 can include a JSON body having a field named, e.g., "RequestedQoSIndicator." The policy-management device 126 can then use the value of that field to determine the 5QI.

In some examples, the first setup message 422 (e.g., from QoS controller 128 to a routing device 108 such as UPF 216, or to AMF 220 or another access controller) includes an NR NAS PDU Session Modification Command. The PDU Session Modification Command can be sent via N11 to AMF 220, or can be sent directly to base station 214.

At 426, the control unit can send, to the first network terminal, a first completion message 428 indicating establishment of the first SF 406. First completion message 428 can include, e.g., a SIP 200 OK or other 1xx or 2xx response, or an NR NAS PDU session modification complete response. In some examples, the control unit sends first completion message 428 independently of any other terminals 102 that may be participating in or communicating via the first communications channel. For example, each terminal 102 can send an INVITE or NAS response and receive a completion message 428 with respect to its own SF 114.

In some examples, operations 402-426, or 402, 410, 420, and 426, are performed more than once for respective, different requests to create specialized flows. This can permit allocating available bandwidth, e.g., of a particular PDU session, based on the specific needs of a particular specialized application 318. For example, non-GBR streaming video can be designated with one 5QI value, conversational voice with a second, different 5QI, and GBR data flows with a higher-priority 5QI.

FIG. 4B shows further operations of process 400 performed, e.g., by a control unit of flow-management device 122. Operation 426 is followed by operation 430 in the illustrated example. In some examples, at least one of operations 402-426 is followed by operation 430. In some examples, operations of FIG. 4B are performed before operations of FIG. 4A, and operation 454 is followed by operation 402. In some examples, operations of FIGS. 4A and 4B are performed in parallel, e.g., by multiple control units or by timesliced operation of a single control unit.

Accordingly, operations of FIG. 4A can be interleaved with operations of FIG. 4B in any combination. All the operations of FIG. 4A are mutually independent with respect to each operation of FIG. 4B independently, and vice versa.

At 430, the control unit can receive, from a second network terminal 102, 202, 302 via the communications interface, a second request 432 to create a second SF 434. The second request 432 can identify a second communication channel. For example, the second request 432 can include identification 436 of the second communication channel.

In some examples, the first communication channel is communicatively connected with the second communication channel. For example, in a communication between first and second terminals, the first communication channel can be identified (#408) by the address/port at the first terminal, and the second communication channel can be identified (#436) by the address/port at the second terminal. In some examples, the first communication channel is the same as the second communication channel. For example, the first and second communication channels can both be identified by the same multicast address, e.g., an Ethernet, IPv4, or IPv6 multicast address. Some of the examples in this paragraph can provide a virtual LAN, with the INVITE or other request 404, 432, or the channel identification 408, 436, specifying a virtual lobby or group to join.

At 438, the control unit can make a third determination 440 that the second request 432 indicates a second predetermined media type (mtype) 442. Examples are discussed herein, e.g., with reference to operation 410. In some examples, the second mtype 442 is not an audio media type, and the second mtype 442 is not a video media type. Examples are discussed herein, e.g., with reference to first mtype 414.

At 444, the control unit can make a fourth determination 446 that the second request 432 is associated with a second authorized user. Examples are discussed herein, e.g., with reference to operation 416. The second authorized user can be the same as the first authorized user, or can be a different user. Operations 444 and 438 are mutually independent.

At 448, the control unit can send a second setup message 450 via the communications interface to the policy-management device 126. The control unit can send the second setup message 450 in response to the third determination 440 and to the fourth determination 446. Examples are discussed herein, e.g., with reference to operation 420. The second setup message 450 can request establishment of the second SF 434. The second setup message 450 can include a second QoS indicator 452. Second QoS indicator 452 can be the same (e.g., have the same value) as the first QoS indicator 424, or can be different therefrom.

Second QoS indicator 452 can request substantially the same QoS characteristics as the first QoS indicator 424, or can request different QoS characteristics. For example, first QoS indicator 424 may indicate 5QI 10, and second QoS indicator 452 may include signaled QoS characteristics of GBR, priority 11, delay budget 5 ms, packet error rate $10^{-5}$, and default maximum data burst volume 160 B. These QoS characteristics are substantially equivalent; 5QI 10 is a shorthand for the QoS characteristics listed in the preceding sentence.

At 454, the control unit can send, to the second network terminal, a second completion message 456 indicating establishment of the second SF 434. Examples are discussed herein, e.g., with reference to operation 426. As discussed above with reference to operation 426, the control unit can send the second completion message 456 independently of any other terminals 102 that may be attached/attaching to the second communication channel (#436) or communicating thereby.

In some examples, the second request 432 identifies the first network terminal 102. For example, second request 432 from terminal 102(N) can identify terminal 102(1). In some examples, second request 432 can include a network address or hostname of the first network terminal 102, or an MSISDN, SUFI, or other identifier of a user or subscriber associated with the first network terminal 102. This can permit establishing a virtual LAN via SFs 406, 434, with the first network terminals 102 hosting the virtual LAN and other terminal(s) 102 joining the virtual LAN.

Figure 5:
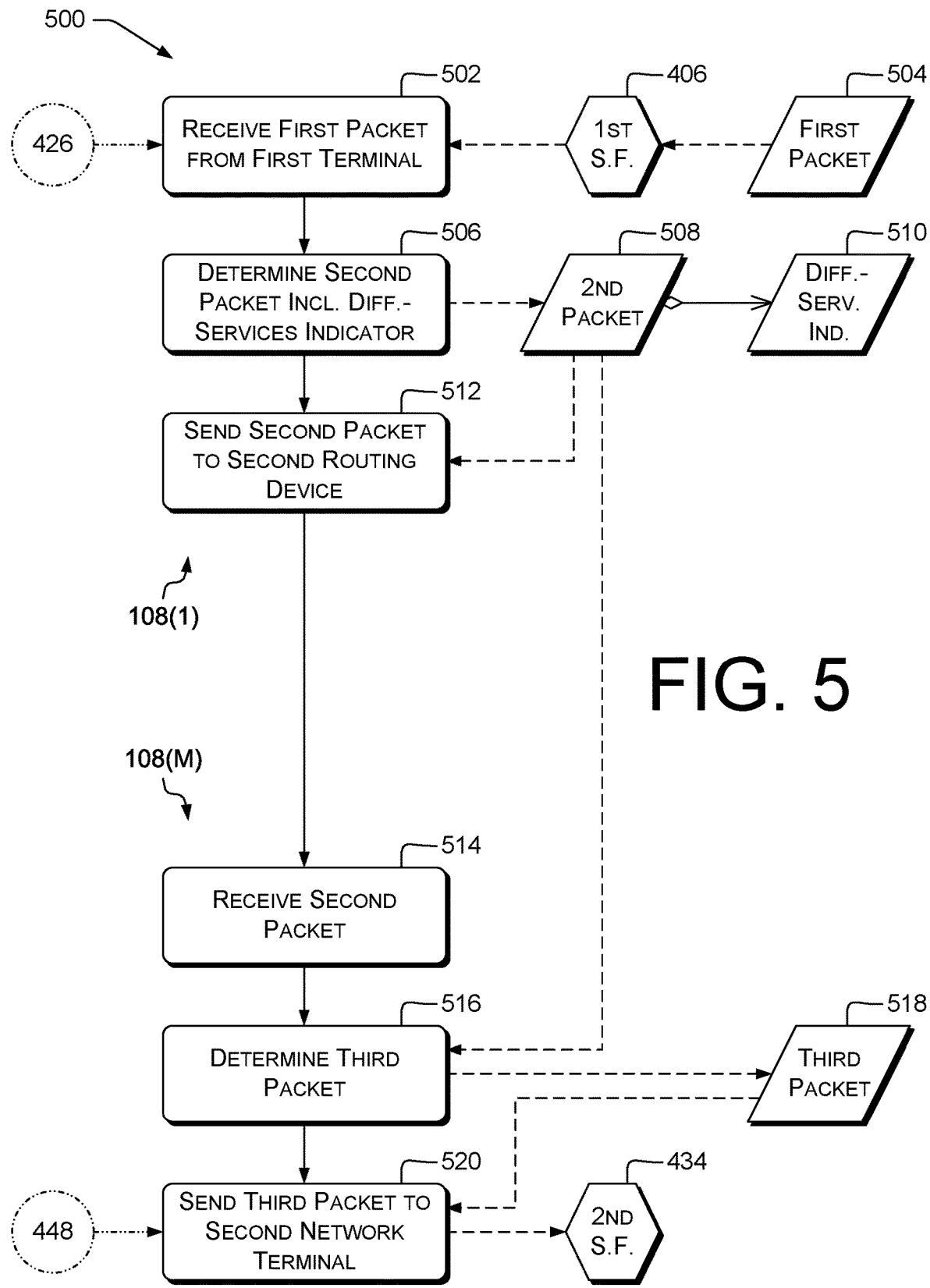
FIG. 5 illustrates an example process of forwarding packets via specialized flows, e.g., using Internet Protocol (IP)-based Quality of Service (QoS).

FIG. 5 is a dataflow diagram illustrating an example process 500 performed by server(s) 304 for data exchange or routing, and related data items. For clarity, dataflow is shown dashed. In some examples, server(s) 304, e.g., routing device(s) 108, include control unit(s) configured to perform operations described below, e.g., in response to computer program instructions of the session-operations module 330. In some examples, at least: operation 502 can be performed after operation 426 or 602; operation 520 can be performed after operation 448 or 606.

In some examples, the one or more routing devices 108 include a first routing device 108(1) and a second, different routing device 108(M). In some examples, the first routing device 108(1) performs operations 502-512. In some examples, the second routing device 108(M) performs operations 514-520.

At 502, the control unit of the first routing device 108(1) can receive a first packet 504 from the first network terminal, e.g., terminal 102(1). For example, the control unit can receive the packet via the first SF 406, e.g., via an NR DRB associated with first SF 406. Packet 504 can be carried over, or tunneled via, an N3 or N9 interface from another routing device 108.

At 506, the control unit of the first routing device 108(1) can determine a second packet 508 based at least in part on the first packet, the second packet comprising a DSI 510 associated with the first QoS characteristics 604. The DSI 510 can be or include a mask, e.g., a subnet mask or other mask to be applied to an IPv4, IPv6, or other network address to identify a flow. Additionally or alternatively, the DSI 510 can be or include, e.g., a DSCP, Type of Service (ToS) (IPv4), Traffic class (TC) (IPv6), or Flow Label (IPv6) value. For example, the control unit can use a stored table to determine a DSCP based on the 5QI of the first SF 406 or other information in the first QoS indicator 424. An example of such a table is GSMA FCM.01 v2.0 (October 2014) § 3.7.4, Table 3 (where QCIs in the table correspond to 5QIs having the same numerical values). In some examples, the stored table used by the control unit includes at least one value not found in FCM.01. In some examples not shown, the first terminal 102(1) includes a DSI (omitted for brevity) in the first packet 504 before sending first packet 504. In some examples, DSI 510 is different from a DSI in first packet 504.

At 512, the control unit of the first routing device 108(1) can send the second packet 508 to the second routing device 108(M). In some examples, the control unit can send the second packet 508, or a copy or version thereof, over flow 120 between routing device 108(1) and routing device 108(M). This can be done using, e.g., IP routing based on routing tables exchanged by exterior gateway protocols or interior gateway protocols. The routing tables can provide the IPv4 or IPv6 addresses of the second routing device 108(M) or another network device via which packets can be forwarded toward terminal 102(N). Other examples of packet transmission are discussed herein, e.g., with reference to operation 520. Operation 512 can precede operation 514.

At 514, the control unit of the second routing device 108(M) can receive the second packet 508, e.g., via a network interface configured to receive packets via flow 120. For example, routing devices 108(1) and 108(M) can be connected via a private network (IPv4 or IPv6), such as a VPN, dedicated trunks, or a combination thereof.

At 516, the control unit of the second routing device 108(M) can determine a third packet 518 based at least in part on the second packet 508. In some examples, third packet 518 may exclude the DSI 510 or include a different DSI than DSI 510. Additionally or alternatively, third packet 518 may have an increased hop count or decreased time-to-live compared to second packet 508. Additionally or alternatively, third packet 518 may differ from second packet 508 in the presence or value of at least one header or field.

At 520, the control unit of the second routing device 108(M) can send the third packet 518 to the second network terminal, e.g., terminal 102(N). For example, the control unit can transmit the third packet 518, or a copy or version thereof, via an N9/N3 interface or tunnel towards the second SF 434, e.g., towards an access network 204 supporting SF 240. Routing tables can be used to determine an address of a next-hop UPF 216, or of a gNodeB or other base station 214, via which packets can be sent to terminal 102(N).

Various examples using process 500 can provide virtual-LAN routing between two or more terminals, each of which is associated with a respective, different SF (e.g., SFs 114, 116). For example, the two or more terminals can include at least three terminals. In some examples, routing device 108(M) can perform operations corresponding to 516 and 520 to determine a fourth packet based at least in part on the second packet 508 and send the fourth packet to a third network terminal. In some examples, operation 512 can include sending a fifth packet corresponding to the second packet to a third routing device 108(i), 1<i<M. The third routing device 108(i) can then perform operations corresponding to 514-520 to send the fourth packet to the third network terminal. Various examples can thus permit exchange of low-latency traffic among groups of terminals 102.

Figure 6:
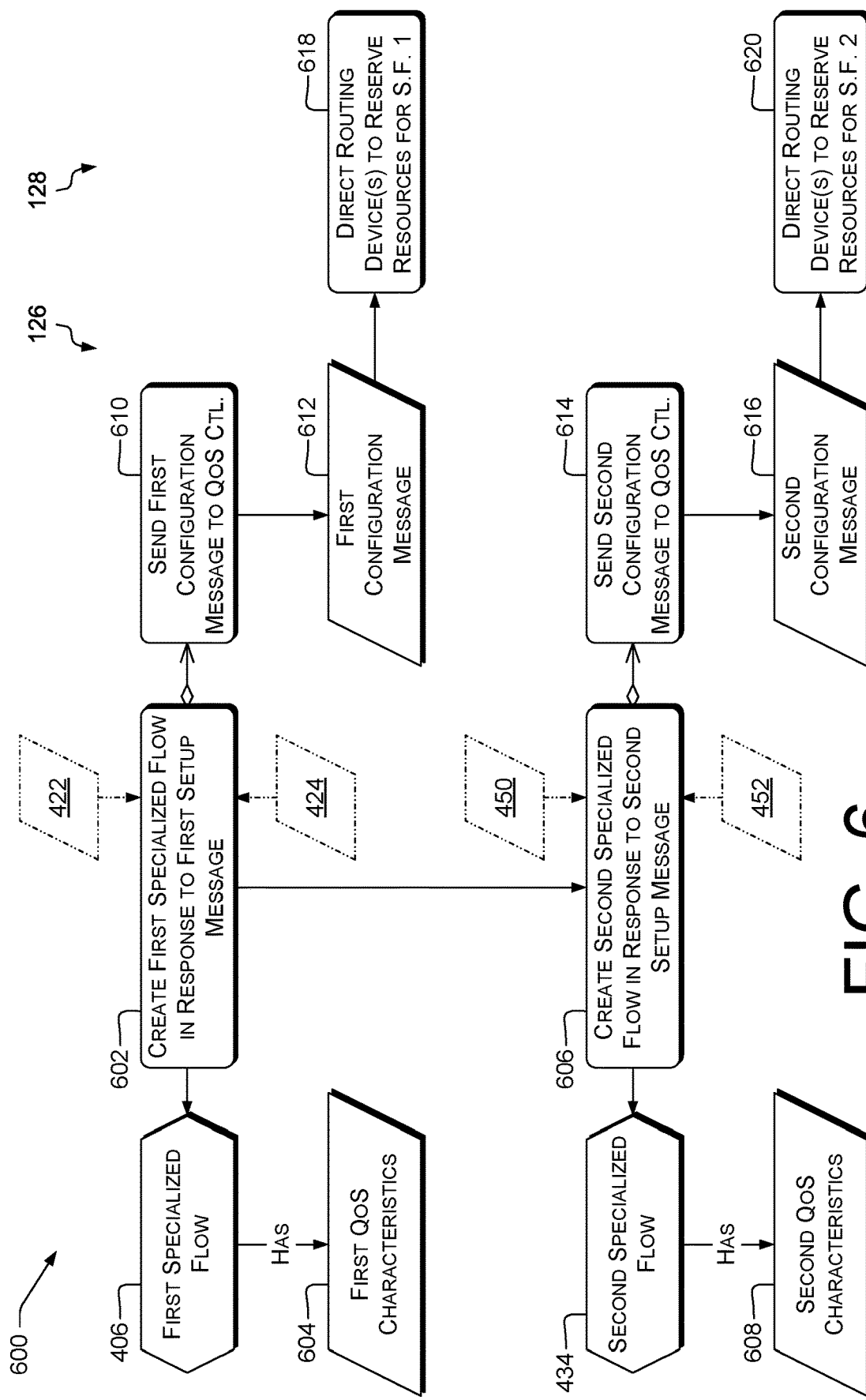
FIG. 6 illustrates an example process for creating multiple specialized flows.

FIG. 6 is a dataflow diagram illustrating an example process 600 for flow management, and related data items. Process 400 can be performed, e.g., by a server 304 of a telecommunication system 300, e.g., including communications interface 322 and at least one processor 324. Server 304 can be or include, e.g., a policy-management device 126 such as PCF 218. In some examples, the server 304 includes control unit(s) configured to perform operations described below, e.g., in response to computer program instructions of the flow-management module 328. Operations 602 and 606 are mutually independent. In some examples, process 600 is used in a system comprising a control device of an application network 104 configured to perform at least some operations of process 400.

Some example of process 600 can be performed by a system further including operations performed by a QoS controller 128. Examples are discussed herein, e.g., with reference to operations 610-620.

At 602, the control unit can create the first SF 406 having first QoS characteristics 604 in response to the first setup message 422. In some examples, operation 602 can include receiving the first setup message 422 from the flow-management device 122 or other control device of the application network 104. Operation 602 can include operation 610, in some examples.

Operation 602 can include, e.g., sending messages to a routing device 108 such as UPF 216. Operation 602 can include sending a Diameter Gx Re-Auth-Request (RAR) or CC-Answer (CCA) command from PCF 218 to UPF 216, in some examples. The RAR or CCA can include a QoS-Information AVP (3GPP TS 29.212 v15.3.0 § 4.5.5.0, § 5.3.16, § 5.3.17), e.g., as discussed herein with reference to first QoS indicator 424.

Additionally or alternatively, operation 602 can include sending messages over the N7 reference point to SMF 212 or another QoS controller 128, or over the N15 reference point to AMF 220 or another access controller. N7 messages can include, e.g., messages of a PCF-initiated Session Management Policy Modification procedure (3GPP 23.502 v15.4.0 § 4.16.5.2). For example, the control unit can send an Npcf_SMPolicyControl_UpdateNotify message to the QoS controller 128 to cause the QoS controller 128 to create SF 406. N15 messages can include, e.g., messages of a PCF-initiated AM policy association modification procedure (29.513 v15.1.0 § 5.1.2.2; 23.502 § 4.16.2.2). For example, the control unit can send an Npcf_AMPolicyControl_UpdateNotify message to an AMF 220 to cause the AMF 220 to create SF 406. In some examples, N7 or N15 messages can have implicit-subscription semantics. For example, the first message sent between a particular pair of endpoints over N7 or N15 can establish a subscription by the sender to messages from the receiver, or vice versa.

In some examples, the first SF 406 permits exchange of first data between the first network terminal 102 and at least one of the one or more routing devices 108 (e.g., UPF 216). In some examples, the first QoS characteristics 604 are associated with the first QoS indicator 424. In some examples, the first SF 406 is not a VoNR or other Vo5G bearer; and the first SF 406 is not a ViNR or other Vi5G bearer. For example, the 5QI of first SF 406 can be other than 1, 2, or 5.

At 606, the control unit can create the second SF 434 having second QoS characteristics 608 in response to the second setup message 450. In some examples, operation 602 can include receiving the second setup message 450 from the flow-management device 122 or other control device of the application network 104. Examples are discussed herein, e.g., with reference to operation 602. Operation 606 can include operation 614, in some examples.

In some examples, the second SF 434 permits exchange of second data between the second network terminal and at least one of the one or more routing devices 108, e.g. routing device 108(1) or 108(M). In some examples, the first SF 406 and the second SF 434 are connected to the same routing device 108. In some examples, the first SF 406 and the second SF 434 are connected to respective, different routing devices 108. In some examples, the second QoS characteristics 608 are associated with the second QoS indicator 452. Examples are discussed herein, e.g., with reference to the first QoS characteristics 604.

In some examples, the second SF 434 is not a VoNR or other Vo5G bearer; and the second SF 434 is not a ViNR or other Vi5G bearer. Examples are discussed herein, e.g., with reference to the first SF 406 and the first QoS characteristics 604.

Some examples relate to multiple terminals 102 whose sessions are controlled by respective, different QoS controllers 128, e.g., multiple SMFs 212. Other examples relate to multiple terminals 102 whose sessions are controlled by a common QoS controller 128, e.g., a common SMF 212. For example, computer-mediated competition may be carried out among multiple users in relatively close proximity (e.g., within the same room, apartment, house, building, cell, or tracking area). In some examples using a common QoS controller 128, process 600 can include operations 610 and 614, e.g., performed by a control unit of a policy-management device 126. Process 600 can further include operations 618, 620, e.g., performed by a control unit of a QoS controller 128.

At 610, the control unit (e.g., of a policy-management device 126) can create the first specialized flow 406 at least partly by sending a first configuration message 612 to the QoS controller 128. The first configuration message 612 can include, e.g., a Session Management Policy Association Modification message (23.502 Figure 4.3.3.2-1), or other types of message described above.

At 614, the control unit (e.g., of a policy-management device 126) can create the second specialized flow 434 at least partly by sending a second configuration message 616 to the QoS controller 128. Examples are discussed herein, e.g., with reference to operation 610.

At 618, the control unit (e.g., of the QoS controller 128) can direct at least one of the one or more routing devices to reserve network resources for the first specialized flow based on the first QoS characteristics. Operation 618 can be performed in response to the first configuration message 612. Operation 618 can include receiving the first configuration message 612. The instruction to the routing device(s) 108 directed to reserve the network resources can include instruction(s) to, for example:

- limit the peak or average bandwidth consumed by a QoS flow or DRB to a particular amount
- allocate a certain amount of bandwidth, processing power, or transcoding or other special-purpose resource capacity in the routing device(s) 108 to a flow
- set parameters relating to prioritization between flows, such as priority level, retention priority, or pre-emption capability
- adjust bit rate limits (min/average/max) or packet error/loss rates (max) for a PDU session as a whole (aggregate) or for individual flow(s) within a PDU session
- record whether or not a flow is a GBR flow
- set a packet delay budget
- set an averaging window over which average bit rates are computed
- set characteristics of permissible data bursts (e.g., permit a certain data rate or a certain percentage of a bandwidth cap for a certain length of time or in a certain timeslot).

In some examples, operation 618 can include sending a PDU Session Modification Command over N11 to the AMF 220. AMF 220 will forward the PDU Session Modification Command over N2 (via the next generation application protocol, NGAP) to the base station 214 (e.g., a gNodeB). Additionally or alternatively, AMF 220 may produce an N2 PDU Session Resource Modify Request (equivalently, a PDU Session Modification Command) and send it to the base station 214.

In some examples, operation 618 can include sending PDUSession messages over N4 to UPF 216. Example messages can include, e.g., an Update SM Context operation).

At 620, the control unit (e.g., of the QoS controller 128) can direct at least one of the one or more routing devices to reserve network resources for the second specialized flow based on the second QoS characteristics. Operation 620 can be performed in response to the second configuration message 616. Operation 620 can include receiving the second configuration message 616. Examples are discussed herein, e.g., with reference to operation 618.

Figure 7:
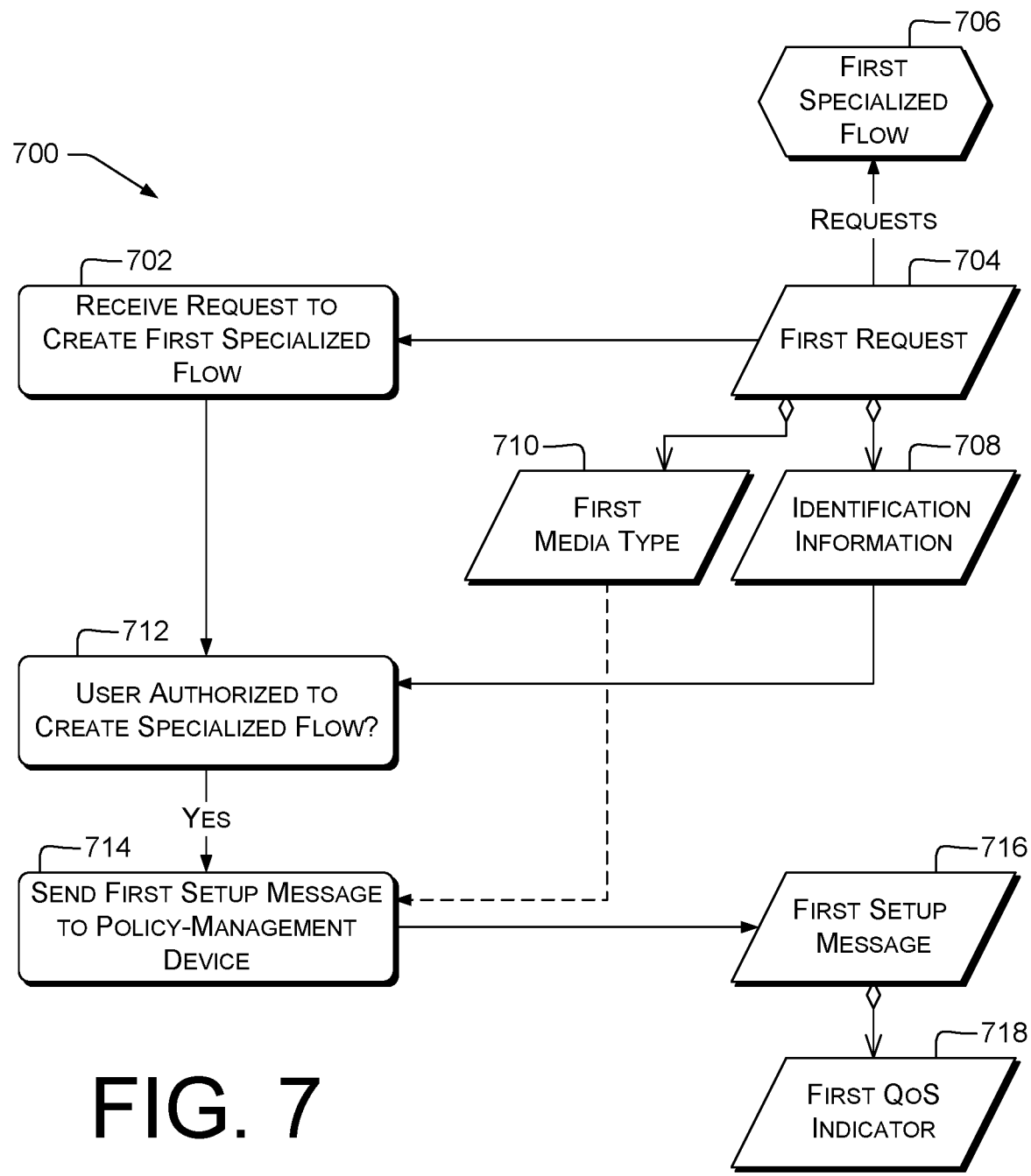
FIG. 7 illustrates an example authorization-verification and bearer-creation process.

FIG. 7 is a dataflow diagram illustrating an example process 700 for flow management, and related data items. Process 700 can be performed, e.g., by a server 304 of a telecommunication system 300, e.g., including communications interface 322 and at least one processor 324. Server 304 can be or include, e.g., a flow-management device 122 such as P-CSCF 222, or a QoS controller 128 such as SMF 212. In some examples, the server 304 includes control unit(s) configured to perform operations described below, e.g., in response to computer program instructions of the flow-management module 328. All the operations of FIG. 7 are mutually independent with respect to each operation of FIG. 8 independently, and vice versa.

At 702, the control unit can receive, via a communications interface from a network terminal 102, a first request 704 to create a first SF 706 in an NR access network. Examples are discussed herein, e.g., with reference to operation 402, first request 404, and first SF 406. The first request 704 can be, e.g., a SIP INVITE, PDU session establishment or modification request, or a NAS session modification request). The first request can indicate a user, e.g., by including identification information 708 of the user. Examples are discussed herein, e.g., with reference to operation 416. In some examples, the control unit is a control unit of a P-CSCF 222 or an AS 230, and the identification information 708 includes a SIP From: or P-Asserted-Identity: header or header value. In some examples, the control unit is a control unit of an SMF 212, and the identification information 708 includes an Nsmf value such as those listed in the following paragraph.

In some examples, identification information 708 can be or include a value of a SIP From: or P-Asserted-Identity: header, a Gx User-CSG-Information AVP, a Gx User-Equipment-Info AVP, an attribute in an Nsmf SMContextCreateData or SMContextUpdateData record (e.g., the value of any of the following attributes: supi, unauthenticatedSupi, pei, or gpsi), or an attribute in an NAS PDU session modification request or session modification command or corresponding NGAP (N2) message (e.g., the value of the PDU session ID attribute). Identification information 708 can include, e.g., a SUPI or MSISDN; a Generic Public Subscription Identifier (GPSI); a PEI of a terminal 102 associated with the user; a PDU Session ID of a PDU session already established and associated with a particular user; or a network address or address/port pair of a terminal 102 associated with the user.

In some examples, the first request 704 can indicate a first media type 710, e.g., a media type different from an audio media type, a video media type, or both an audio and a video media type. For example, the first request 704 can indicate the first media type 710 as a value in a SIP Content-Type header, an SDP m=line, an Rx Media-Type AVP, a Gx Bearer-Usage AVP (e.g., value ≥2; cf. 3GPP 29.212 § 5.3.1), a Gx Priority-Level AVP (e.g., the value being associated with low-latency data services), or an Npcf_PolicyAuthorization MediaType. Examples are discussed herein, e.g., with reference to first mtype 414.

In some examples, the first specialized flow 706 is not associated with an IMS. For example, the first request 704 can include a session-establishment request associated with a non-IMS DNN, or a session-modification request for a service that is not facilitated by IMS. Examples of such services can include non-Vo5G and non-Vi5G services such as real-time messaging or low-latency state-synchronization data transfers such as those commonly used in real-time computer-mediated competition.

At 712, the control unit can determine that the user is authorized to create the first SF, e.g., that the user's account carries authorization for creation of SFs on behalf of that account. Examples are discussed herein, e.g., with reference to operation 416.

At 714, the control unit can send, in response, via the communications interface to a policy-management device, a first setup message 716 requesting creation of the first SF 706. The first setup message 716 can include a first QoS indicator 718 associated with the first request 704. In some examples, indicated by the dashed arrow, first QoS indicator 718 can additionally or alternatively be associated with first media type 710. Examples are discussed herein, e.g., with reference to operation 420, first setup message 422, and first QoS indicator 424. Examples of QoS parameters that can be included in or indicated by first QoS indicator 718 are discussed herein with reference to operation 618.

Some examples of process 700 can provide or be used with a special-purpose DNN having a low-latency default QoS flow. For example, the first request 704 can be a creation request for a PDU session. Operation 714 can include sending the first setup message 716 requesting creation of the first specialized flow 706 as the default QoS flow in the new PDU session. This can permit readily separating, e.g., IMS and low-latency traffic. This can also permit carrying low-latency traffic without requiring retrieval of special-purpose QoS flow rules from policy-management device 126, which can reduce the amount of data exchanged during, and therefore speed, processing of first request 704.

In other examples, the first request 704 can be a request for a low-latency QoS flow within an existing PDU session, e.g., an IMS or Internet PDU session. Operation 714 can include sending the first setup message 716 requesting creation of a non-default QoS flow in that PDU session. For example, operation 712 or 714 can include sending the first setup message 716 to policy-management device 126, which can then determine whether the non-default flow is authorized, and return an indication to the control unit.

Figure 8:
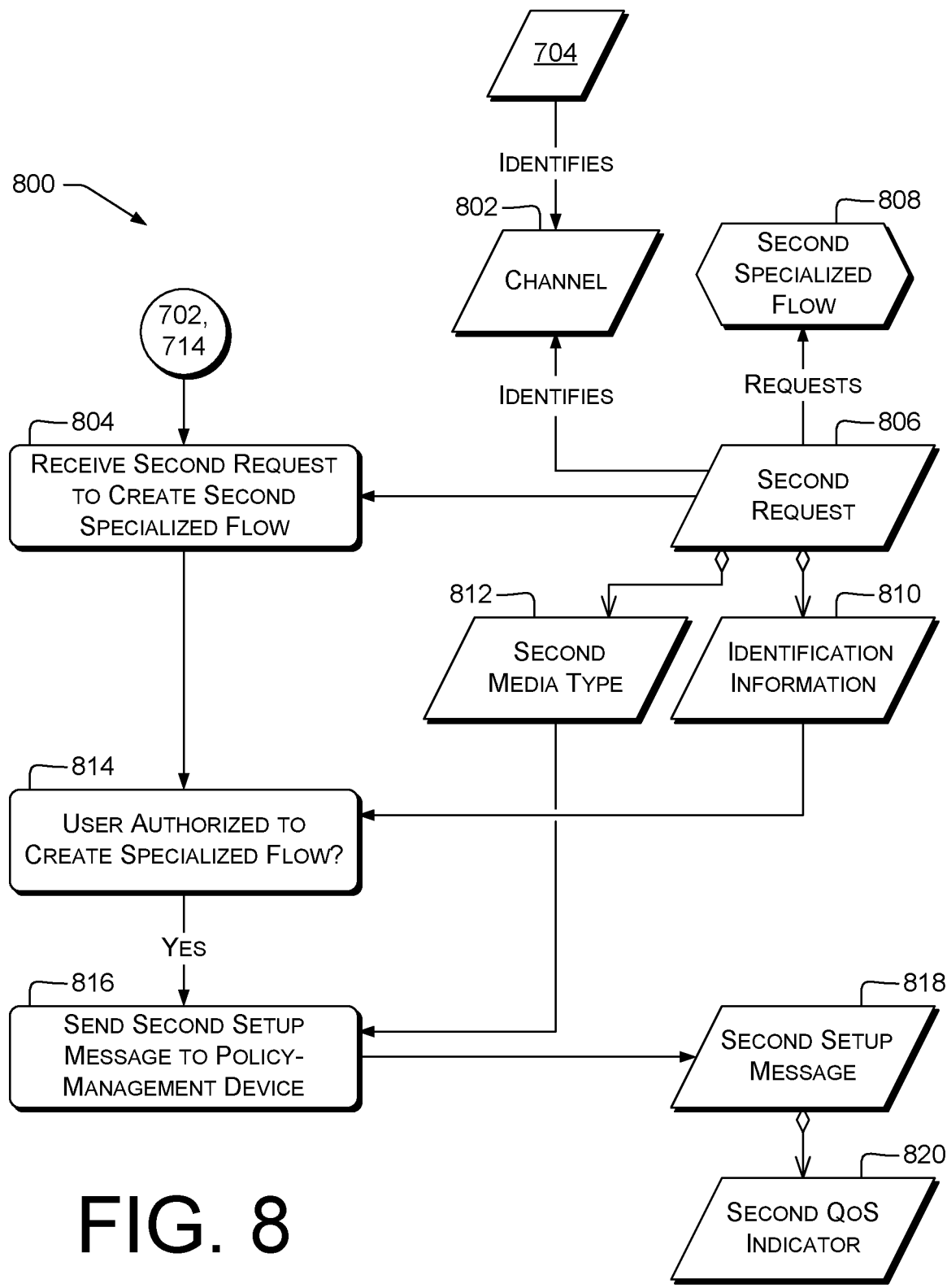
FIG. 8 illustrates an example process of creating multiple specialized flows for a channel.

FIG. 8 is a dataflow diagram illustrating an example process 800 for flow management, and related data items. In some examples, control unit(s) of server(s) 304, e.g., a flow-management device 122 or a QoS controller 128 such as SMF 212, perform operations described below, e.g., in response to computer program instructions of the flow-management module 328. In some examples, operations of process 800 can be performed after or at least partly in parallel with operations of process 700. For example, operation 804 can be performed after operation 702 or 714.

In some examples, first request 704 identifies a channel 802. Examples are discussed herein, e.g., with reference to first communication channel identification 408. In some examples, as noted above, first request 704 indicates a first media type 710.

At 804, the control unit can receive, from the communications interface from a network terminal, a second request 806 to create a second SF 808 in an NR access network. The second request 806 can identify the channel 802. The second request 806 can indicate a second user, e.g., by including identification information 810. The second request 806 can indicate a second media type 812, which can be different from the first media type 710. In some examples, second media type 812 can be different from an audio media type. Examples are discussed herein, e.g., with reference to operation 430 and second mtype 442.

At 814, the control unit can determine that the second user is authorized to create the second SF 808. Examples are discussed herein, e.g., with reference to operations 444 and 712.

At 816, the control unit can send, via the communications interface to the policy-management device 126, a second setup message 818 requesting creation of the second SF 808. Operation 816 can be performed in response to the determination at operation 814. The second setup message 818 can include a second QoS indicator 820 associated with the second media type 812. Examples are discussed herein, e.g., with reference to operation 714.

Various examples of process 800 provide multiple SFs for a particular session or channel. This can permit, e.g., different types of interactions between users or terminals 102 in a session to be carried using SFs having different 5QIs. For example, a computer-mediated competition might involve the exchange of both state information requiring low latency and contextual information (such as virtual time of day) capable of tolerating higher latency Using multiple SFs in this and other examples can permit using network resources more effectively than schemes in which all traffic is given low-latency treatment. Using multiple SFs can thus can increase network robustness and capacity.

Figure 9:
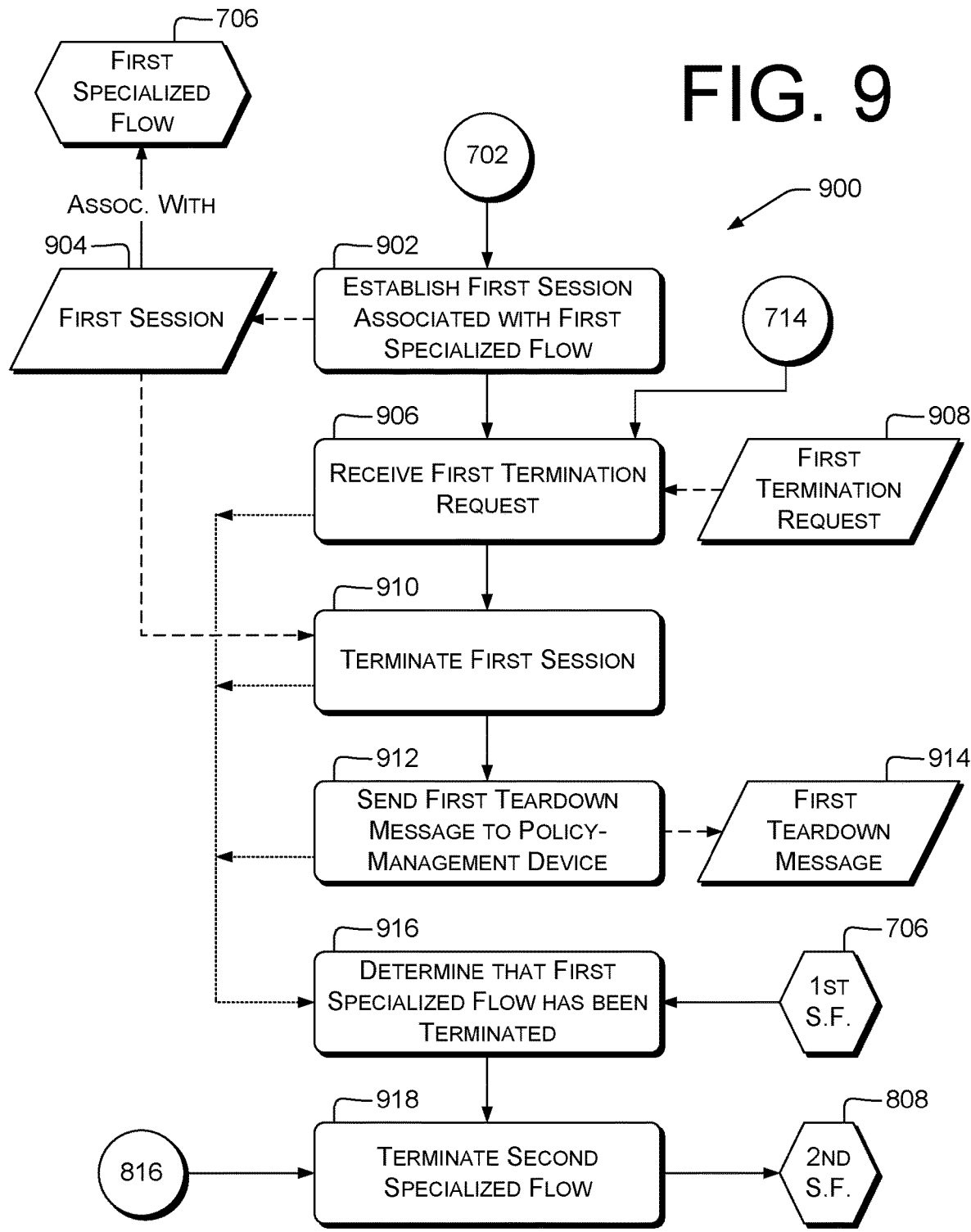
FIG. 9 illustrates an example process of managing a session associated with a specialized flow.

FIG. 9 is a dataflow diagram illustrating an example process 900 for flow management or session management, e.g., creation or teardown of flows or sessions, and related data items. For clarity, dataflow is shown dashed. In some examples, control unit(s) of server(s) 304, e.g., a P-CSCF 222 or other flow-management device(s) 122, or an SMF 212 or other QoS controller(s) 128, perform operations described below, e.g., in response to computer program instructions of the session-operations module 330 or the flow-management module 328. In some examples, operations 902-918 are performed by session-operations module 330. Alternatively, operations 902-912 can be performed by session-operations module 330 and operations 916-918 by flow-management module 328. Alternatively, operations 902-916 can be performed by session-operations module 330 and operation 918 by flow-management module 328. In some examples, operation 702 can be followed by operation 902; operation 906 can be performed after operation 714; or operation 918 can be performed after operation 816.

At 902, the control unit can establish, in response to the first request 704, a first session 904 associated with the first SF 706. This can be done, e.g., using SIP procedures for establishment of dialogs in response to a SIP INVITE. For example, as discussed herein with reference to operation 714, the P-CSCF 222 can request the policy-management device 126 create the SF 706 associated with address(es), port number(s), protocol(s), or other network resource(s) listed in an SDP body of the INVITE. Examples of network resources are discussed herein, e.g., with reference to network resource 1108. The control unit can record information about the session and the associated network resource(s) in a memory, e.g., CRM 326.

At 906, the control unit can receive, after sending the first setup message 716, a first termination request 908. For example, the first termination request 908 can include a SIP BYE request. Additionally or alternatively, the first termination request 908 can include an Nsmf_PDUSession_UpdateSMContext message triggered during an access-network context release procedure (23.502 § 4.2.6) indicating failure of an access network 204 or AMF 220 carrying at least a portion of the first session 904; an Namf_EventExposure_Notify message indicating a loss of connectivity (23.502 § 4.15.3.1 and § 4.15.3.2.2); or a report to a QoS controller 128 of loss of connectivity, e.g., in response to an N2 UE Context Release Request message with a Cause IE indicating "connectivity lost" (38.413 § 8.3.2, § 9.2.2.4) In response, the control unit can perform operations 910 and 912.

At 910, the control unit can terminate the first session 904. For example, the control unit can perform SIP dialog teardown procedures or NAS/Nsmf PDU Session teardown procedures. The control unit can update or remove memory-stored information about the session.

At 912, the control unit can send, via the communications interface to the policy-management device 126, a first teardown message 914 requesting removal of the first SF 706. The first teardown message 914 can include, e.g., a Diameter CCR, ASR, or STR message (e.g., 29.213 v15.3.0 § 4.2). Additionally or alternatively, the control unit (e.g., of a QoS controller 128) can send (e.g., via AMF 220) instructions to release or un-reserve resources for QoS flows associated with the first SF 706 (e.g., an N2 UE Context Release Command, 38.413 § 9.2.2.5).

In some examples, multiple flows are used, e.g., as discussed herein with reference to FIG. 8. Some of these examples manage the multiple flows as a group using operations 916 and 918. Operation 906, 910, or 912 can be followed by operation 916.

At 916, the control unit can determine that the first SF 706 has been terminated. In some examples, the control unit can receive a Diameter CCR or ASR associated with the first SF 706, or another message indicating that first SF 706 has been terminated.

At 918, the control unit can terminate the second SF. Operation 918 can be performed in response to the determination at operation 916. Examples are discussed herein, e.g., with reference to operations 910 and 912.

In some examples, responding to SF termination by terminating other SFs, e.g., associated with the same session (e.g., first session 904), can simulate a LAN failure in which all connectivity is lost. This can reduce the probability of data loss or corruption in an application due to successful transmission of only some types of data, and therefore improve networked-application robustness. In some examples, operations 916 and 918 can be performed at terminal 102 instead of or in addition to at server 304.

Figure 10:
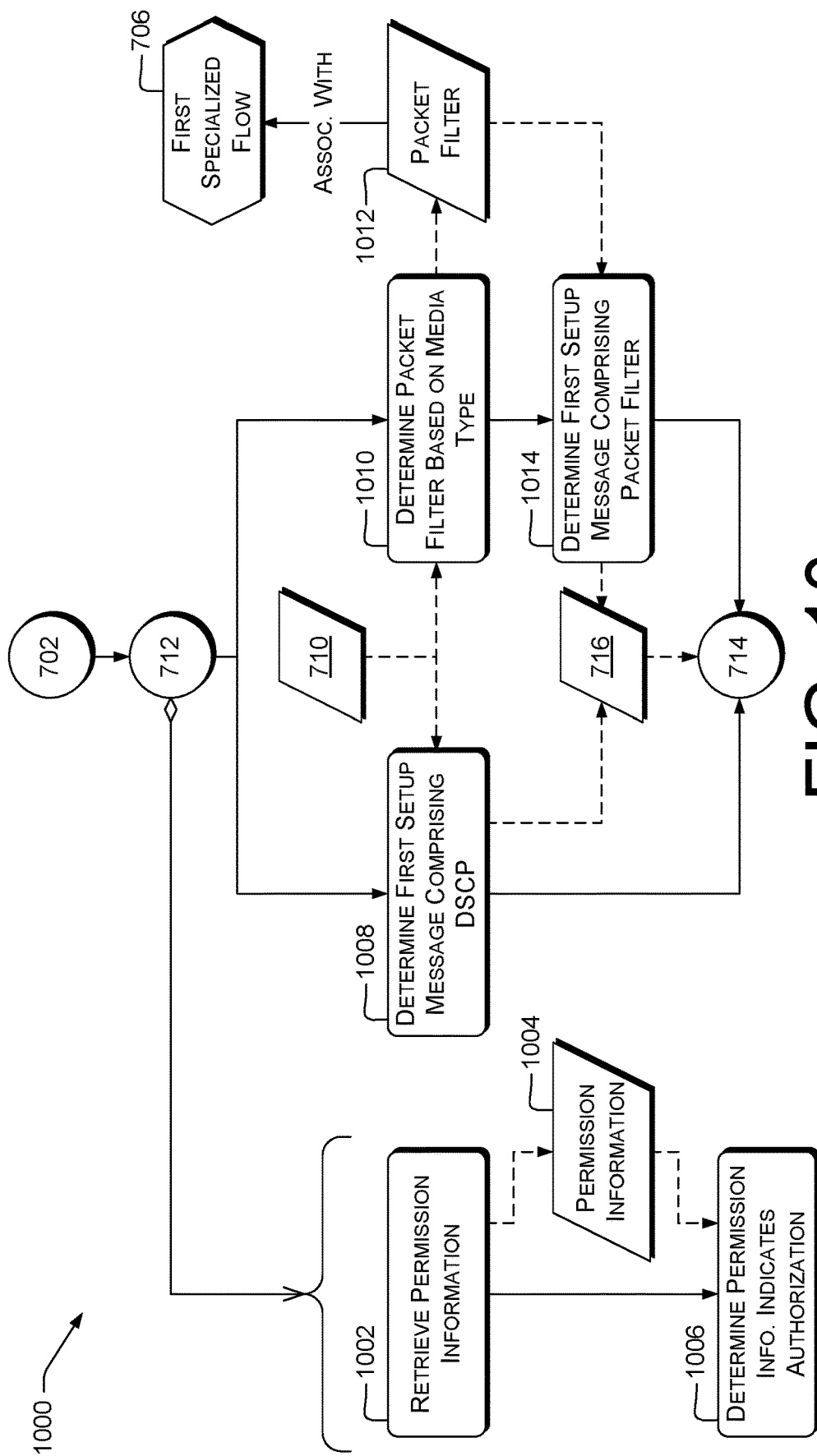
FIG. 10 illustrates example processes of authorizing users and determining setup messages.

FIG. 10 is a dataflow diagram illustrating example processes 1000 for flow management, and related data items. For clarity, dataflow is shown dashed. In some examples, control unit(s) of server(s) 304, e.g., a flow-management device 122 or a QoS controller 128, perform operations described below, e.g., in response to computer program instructions of the flow-management module 328 or the session-operations module 330. In some examples of operations 1002 and 1006, the control unit is a control unit of PCF 218. In other examples, the control unit is a control unit of P-CSCF 222 or AS 230. In some examples, operation 712 can include operations 1002 and 1006. In some examples, operation 712 can be followed by operation 1008 or operation 1010. In some examples, operation 1008 or 1014 can be followed by operation 714. In some examples, operation 714 can include operation 1008. In some examples, operation 714 can include operations 1010 and 1014.

At 1002, the control unit can retrieve permission information 1004 associated with at least one of (e.g., exactly one of, or both of): the user indicated in first request 704, e.g., identified by identification information 708, or the first SF 706. Examples are discussed herein, e.g., with reference to operation 416. For example, permission information 1004 can include an AVP or other value (e.g., a value of a JSON attribute) indicating authorization to create SFs.

Operation 1002 can include retrieving the permission information 1004 via Diameter or other protocols over the Sp reference point. For example, the control unit can send a Diameter UDR to information server 124, and receive a Diameter UDA including multiple AVPs. Operation 1002 can additionally or alternatively include retrieving the permission information 1004 via an Npcf request, e.g., to retrieve an individual SM policy (3GPP 29.512). In some examples, the control unit can send QoS parameters or other information associated with the first SF 706 to the information server 124 or the policy-management device 126 before receiving the permission information 1004. In various examples, operation 1002 can include retrieving the information from a UDM/UDR, HLR/HSS, or PCF (e.g., information server 124 or policy-management device 126).

At 1006, the control unit can determine that the permission information 1004 indicates that the user is authorized to create the first SF 706. Examples are discussed herein, e.g., with reference to operation 416. For example, the control unit can determine that a predetermined AVP in permission information 1004 includes a value representing the authorization to create the first SF 706. In some examples, the information server 124 or the policy-management device 126 responds to the QoS parameters referenced above with permission information 1004 indicating whether or not a flow with the indicated QoS parameters may be created, or may be created by the indicated user. Such an indication can be represented as, e.g., a bit or other Boolean value, or an HTTP or other status code (e.g., 200 OK or 403 Forbidden). In some examples, operation 1002 includes sending and Npcf_SMPolicyControl_Update request from SMF 212 to PCF 218 and receiving permission information 1004 (which may include or be accompanied by a status code) in response, and operation 1006 includes determining that the permission information 1004 (or status code) indicates a successful update (e.g., 200 OK). In contrast to various of these examples, some prior schemes do not retrieve and process user-specific authorization data as described above with reference to operations 1002 and 1006. See, e.g., 29.213 v15.3.0 Figure 4.1.1, NOTE 2.

At 1008, the control unit can determine the first setup message 716 further comprising a DSI associated with the first SF 706. For example, the DSI can be associated with the first media type 710. Examples are discussed herein, e.g., with reference to operation 506 and DSI 510. This can permit the routing device 108 to correctly prioritize packets traveling on flow 120. The DSI can include, e.g., a DSCP, traffic class, or other value usable, e.g., to mark packets being sent via flow 120 or otherwise between or among routing device(s) 108 or application network(s) 104.

At 1010, the control unit can determine a packet filter 1012, e.g., a traffic flow template (TFT), QoS flow description (24.501 § 9.11.4.12), or other packet filter, based at least in part on the first media type 710. The packet filter can be an Ethernet, IP, or other type of packet filter 1012. The packet filter 1012 can be associated with a 5QI of a QoS flow, and can include indications of which network packet(s) should be carried via that QoS flow.

Operation 1010 can include determining the packet filter 1012 listing at least: a network address of the terminal 102; a network port (see, e.g., operation 1106, below); a network prefix or interface identifier (e.g., for IPv6), or identification information described herein with reference to identification 408 or channel 802. For example, the packet filter 1012 can include addresses, ports, protocols, ranges of any of those, DSIs, or other values used in classifying traffic (23.501 § 5.7.6). Examples of values usable in packet filters are discussed herein, e.g., with reference to operation 1106.

At 1014, the control unit can determine the first setup message 716 comprising the packet filter 1012. The packet filter 1012 can be associated with the first SF 706. For example, the first setup message 716 can be a Diameter AAR including the AVP(s) of the packet filter 1012. Additionally or alternatively, the first setup message 716 can be an Npcf_PolicyAuthorization_Update message. Additionally or alternatively, the first setup message 716 can be an N2 PDU Session Resource Setup or Modify request.

In some examples of operations 1010 and 1014, the control unit can determine FlowDescription AVPs to provision to PCF 218 via a Diameter connection over the Rx interface or to routing device 108 (e.g., a UPF) via a Diameter connection over the Gx interface. Additionally or alternatively, the control unit can determine a FlowDescription value to send via an Npcf_PolicyAuthorization_Update operation to PCF 218. Additionally or alternatively, the control unit can determine an N2 PDU Session Resource Setup Request message or N2 PDU Session Resource Modify request to send to the RAN via AMF 220 using an Namf_Communication_N1N2MessageTransfer message (3GPP 38.413 v1.0.0 § 8.2.1, § 8.2.3). The N2 message can include, e.g., values in any of the following information elements (IEs): QoS flow level QoS parameters (38.413 § 9.3.1.12); QoS flow list; DRBs to QoS flows mapping list; QoS flow indicator; PDU session resource setup request transfer; or PDU session resource modify request transfer.

FIG. 11 is a dataflow diagram illustrating an example process 1100 for data transfer using SFs, and related data items. In some examples, control unit(s) of terminals(s) 102, 202, 302, perform operations described below, e.g., in response to computer program instructions of the specialized application 318. In some examples, the control unit(s) include at least one processor 310. The control unit can communicate via a wireless communications interface 314. In the illustrated examples, operation 1110 follows operation 1106. In other examples, operation 1110 precedes at least one of operations 1102 and 1106.

At 1102, the control unit can receive network-address information 1104 via the wireless communications interface. The network-address information 1104 can include, e.g., an IPv4 address, an IPv6 interface ID, an IPv6 prefix, or an IPv6 address. The network-address information 1104 can be associated with a particular APN, in some examples. For example, the control unit can receive the network-address information 1104 in an Attach Accept message from an MME upon initial attachment to an NR network 306. Additionally or alternatively, the control unit can receive the network-address information 1104 in a NAS Activate default EPS bearer context request message sent in response to a NAS PDN connectivity request.

At 1106, the control unit can determine a network resource 1108, e.g., a network port, address, address/port pair, prefix, interface ID, or a range of values of any of those types, associated with the network-address information 1104. For example, the control unit can select an unused network port, e.g., in the range 1024-65535. Operation 1106 can be performed by application-level or OS-level modules. For example, operation 1106 can be carried out by the OS as part of processing of a bind( ) call. In some examples, operation 1106 includes invoking an OS-provided service to determine network resource(s) 1108 that are accessible to specialized application 318. In some examples, specific addresses and ports are accessible to specialized application 318, but specific NR physical resource blocks (PRBs) are not accessible to specialized application 318 (they are managed at a lower level than the lowest level the specialized application 318 can access).

In some examples, before (or as part of) performing operation 1106, the control unit can determine a network address based at least in part on the network-address information 1104, and the network resource 1108 can be associated with the network address. For example, the control unit can extract the network address from the network-address information 1104. Additionally or alternatively, e.g., for an IPv6 address, the control device can retrieve network-prefix information by sending a transmission on a link-local multicast address (e.g., IPv6 fe80:: or ff02::2) and receiving a response. The control device can then determine the network address by combining the network-prefix information with interface-identifier information included in the network-address information 1104.

At 1110, the control unit can send a flow-request message 1112 to a network control device, e.g., a P-CSCF 222 or other flow-management device 122, or to an SMF 212 or other QoS controller 128. Flow-request message 1112 can include, e.g., a SIP INVITE request over N3+N6 to flow-management device 122, or a NAS-SM PDU session modification request over N1+N11 to QoS controller 128. The flow-request message 1112 can indicate the network resource 1108 and a media type 1114. In some examples, the media type 1114 is not an audio media type, and the media type 1114 is not a video media type. For example, the media type 1114 can be a 5QI (e.g., in a NAS-SM message) other than an audio 5QI or a video 5QI. The network resource 1108 can be indicated on an m=line of an SDP body of the SIP INVITE flow-request message 1112, or in a packet filter in a QoS rule IE of a Request QoS rules IE of a PDU Session Modification Request NAS-SM message. In some examples, flow-request message 1112 can include or indicate requested QoS parameters, e.g., such as those discussed herein with reference to operation 618.

In some examples, the specialized flow to be created is a default flow of a PDU session dedicated to low-latency traffic (herein, a "specialized PDU session", "SPS"). In some of these examples, flow-request message 1112 requests an SPS having Session and Service Continuity (SSC) mode three (SSC3). SSC3 can support user mobility by providing a make-then-break connection handoff when moving between respective Terminating User Plane Functions (TUPFs). In some examples, operation 1110 is performed as part of an initial connectivity procedure, e.g., when terminal 102 powers up or comes within range of base station 214.

In some examples, operation 1110 can include or be preceded by an operation of determining a network address of the network control device. For example, an SMF address can be retrieved from an AMF, or a P-CSCF address can be determined using NAPTR and SRV DNS records.

At 1116, the control unit can receive a success message 1118, e.g., a SIP or NAS success message, in response to the flow-request message 1112. SIP success message 1118 can include, e.g., a SIP 2xx response.

At 1120, the control unit can exchange (e.g., transmit or receive) data on the network resource 1108 with a peer network terminal (e.g., peer node 210) via the wireless communications interface. This can be done subsequent to receiving the success message 1118. In some examples, the network resource 1108 is indicated in a TFT or other packet filter 1012, FIG. 10. For example, the radio or related components of terminal 102 can assign data to be transmitted over the network resource 1108 (e.g., a specific port) to a first SF 114, 706 based on a match between network resource 1108 and a port indicated in packet filter 1012. Some examples omit operation 1106 and instead extract the network resource 1108 from the packet filter 1012 after receiving success message 1118.

In some prior VoLTE schemes and some other prior RTP-based schemes, exactly one protocol is used on a particular network port. For example, a SIP INVITE including an SDP body includes m= and a=rtpmap lines specifying candidate protocols, and the SIP offer-answer model includes selecting exactly one of the offered candidates for a particular m=line. By contrast, in some examples, the exchanging data (operation 1120) includes multiplexing data in at least two protocols on the network resource 1108. For example, operation 1120 can include multiplexing a media stream and a file-transfer stream on a particular port. Multiplexing can be done using tunneling protocols such as IPsec, TLS, GTP, or PMIP/PMIPv6. Additionally or alternatively, multiplexing can be done using layer 5-7 tunneling protocols such as BEEP. This can permit virtual-LAN communications, e.g., by multiplexing traffic over multiple network ports on a virtual adapter over a single network resource 1108, e.g., associated with an SF such as SF 114.

Some prior schemes, such as some VoLTE implementations, require that the SIP request URI or To: header identify the party with whom communications are to be carried out. Various examples herein permit more flexible traffic exchange. For example, terminals 102(1) and 102(N), FIG. 1, can be connected via SF 114, flow 120, and SF 116 in a virtual-LAN configuration that routes communications between terminals 102(1) and 102(N) without requiring each terminal 102(1), 102(N) to identify the other. Similarly, some examples provide a virtual-LAN configuration involving more than two terminals. A flow-request message 1112 (e.g., a SIP INVITE) for a channel is directed to the flow-management device 122 or other network control device without requiring the addresses of other terminal(s) that may be participating in that channel. For example, the flow-request message 1112 can list AS 230 (e.g., a computer-mediated-competition server) in a SIP To: header and P-CSCF 222 in a SIP start-line. However, data can be sent via the resulting SF to a terminal 102 that is neither the AS 230 nor the P-CSCF 222.

Accordingly, in some examples, the flow-request message 1112 comprises a request URI indicating a first network entity, e.g., identified by name or URI. In some examples, flow-request message 1112 includes a To-header value indicating a second network entity. In some examples, the peer network terminal is different from the first network entity, and the peer network terminal is different from the second network entity.

In some examples, operations 1106-1120 can be performed more than once to select multiple network resources and establish respective SFs. This can permit carrying out low-latency communications with multiple terminals on a one-to-one bases, or conducting concurrent communications of multiple data streams having varying QoS requirements with a particular terminal 102 or group of terminals 102.

Some examples omit operations 1102 and 1106, or perform those operations after operation 1110. For example, operation 1110 can include sending a request for an SPS (e.g., SSC3 or another SSC), and operation 1102 can include receiving network-address information 1104 associated with the SPS.

FIG. 12 is a dataflow diagram illustrating an example process 1200 for flow management or data exchange, and related data items. For clarity, dataflow is shown dashed. In some examples, control unit(s) of terminals(s) 102 perform operations described below, e.g., in response to computer program instructions of the specialized application 318. In some examples, operation 1202 is performed after operation 1110. In some examples, operation 1120 includes operation 1208.

At 1202, the control unit can receive, after sending the flow-request message 1112, a packet filter 1204 from the network control device. The packet filter 1204 can indicate a SF 1206 (which can represent SF 114, 116, 406, 434, 706, or 808) associated with the wireless communications interface. For example, the packet filter 1204 can be or include a packet filter 1012. In some examples, the packet filter 1204 can include a port or port range, or otherwise at least partly indicate the network resource 1108. The control unit can therefore use the packet filter 1204 to map a port number or other network resource 1108 to radio resources of SF 1206. In some examples, the packet filter 1204 can include one or more QoS flow descriptions (24.501 § 9.11.4.12). Each QoS flow description can include a QoS flow identifier (QFI) identifying SF 1206. Examples are discussed herein, e.g., with reference to packet filter 1012.

At 1208, the control unit can send at least some of the data via the SF 1206 in response to the packet filter 1204. For example, at layers below the IP layer (e.g., layers 1 or 2, or LTE PHY or MAC layers such as RRC or PDCP), data can be mapped onto the SF 1206 if that data or its transmission characteristics (e.g., layer 3 port) matches criteria in packet filter 1204.

FIG. 13 is a dataflow diagram illustrating an example process 1300 for flow management, and related data items. For clarity, dataflow is shown dashed. In some examples, control unit(s) of terminal(s) 102 perform operations described below, e.g., in response to computer program instructions of the specialized application 318. In some examples, either or both of operations 1302 and 1306 can precede operation 1102 or 1106. Operations 1302 and 1306 are mutually independent. In some examples, operations 1102 and 1302 are mutually independent.

In some examples, latency-sensitive traffic is carried on a different DNN or network subset than the IMS DNN. In some of these examples, terminal 102 can request an SPS, e.g., before requesting QoS flows for low-latency traffic. This can permit using a low-latency default QoS on the SPS, as discussed herein with reference to process 700.

At 1302, the control unit can send, via the wireless communications interface, a first message 1304 requesting a first PDU session associated with an IMS DNN. For example, the control unit can send a NAS-SM PDU Session Establishment Request message (24.501 § 6.4.1.2).

At 1306, the control unit can send, via the wireless communications interface, a second message 1308 requesting a second PDU session associated with a second DNN different from the IMS DNN. Examples are discussed herein, e.g., with reference to operations 1110 and 1302. For example, the second PDU session can be an SPS (low-latency PDU session). In some examples, the second message 1308 requests SSC mode three.

The second DNN can identify an SPS. This can permit separating signaling or other relatively less latency-sensitive traffic from relatively more latency-sensitive data traffic, which can improve network management effectiveness.

In some examples, the packet filter 1012 or 1204 is associated with the non-IMS SPS, and passes all traffic associated with network-address information 1104. This can permit virtual-LAN communications, in which terminal 102 can use, for example, any port associated with network-address information 1104 for latency-sensitive communications. This can increase network flexibility and can reduce waste of network resources by the terminal 102.

In some examples, terminal 102 can use IMS traffic or other traffic in a first PDN session to control a second PDN session, such as an SPS. In some examples, operation 1302 can be followed by operation 1110, 1102, or 1106; operation 1110 can include operation 1310; operation 1306 can be followed by operation 1102 or 1106; or operation 1102 can include operation 1312.

At 1310, the control unit can send the flow-request message 1112 via the first PDU session (associated with first message 1304). For example, the control unit can send a SIP INVITE via an IMS PDU session.

At 1312, the control unit can receive the network-address information 1104 associated with the second PDU session (associated with second message 1308). For example, the flow-management device 122, policy-management device 126, and QoS controller 128 can cooperate to create the second PDU session (SPS) in response to the flow-request message 1112, and can then provide packet filters or other network-address information 1104 associated with the second PDU session.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A system, comprising a control device configured to perform first operations, wherein: the first operations comprise: receiving, from a first network terminal, a first request to create a first specialized flow, the first request identifying a first communication channel; making a first determination that the first request indicates a first predetermined media type, wherein: the first predetermined media type is not an audio media type; and the first predetermined media type is not a video media type; making a second determination that the first request is associated with a first authorized user; sending, in response to the first determination and to the second determination, a first setup message, wherein: the first setup message requests establishment of the first specialized flow; and the first setup message comprises a first Quality of Service (QoS) indicator; and sending, to the first network terminal, a first completion message indicating establishment of the first specialized flow; and the first operations further comprise: receiving, from a second network terminal, a second request to create a second specialized flow, the second request identifying a second communication channel; making a third determination that the second request indicates a second predetermined media type, wherein: the second predetermined media type is not an audio media type; and the second predetermined media type is not a video media type; making a fourth determination that the second request is associated with a second authorized user; sending, in response to the third determination and to the fourth determination, a second setup message, wherein: the second setup message requests establishment of the second specialized flow; and the second setup message comprises a second QoS indicator; and sending, to the second network terminal, a second completion message indicating establishment of the second specialized flow.

B: The system according to paragraph A, wherein the control device comprises at least one of a Session Management Function (SMF) or a Proxy Call Session Control Function (P-CSCF).

C: The system according to paragraph A or B, further comprising one or more routing devices, wherein the one or more routing devices are configured to convey traffic between the first specialized flow and the second specialized flow.

D: The system according to paragraph C, wherein: the one or more routing devices comprise a first routing device and a second, different routing device; the first routing device is configured to: receive a first packet from the first network terminal; determine a second packet based at least in part on the first packet, the second packet comprising a differentiated-services indicator associated with the first QoS characteristics; and send the second packet to the second routing device; and the second routing device is configured to: receive the second packet; determine a third packet based at least in part on the second packet; and send the third packet to the second network terminal.

E: The system according to paragraph C or D, wherein: the control device is a control device of an application network; and the system further comprises a policy-management device configured to perform second operations comprising: creating the first specialized flow having first QoS characteristics in response to the first setup message, wherein: the first specialized flow permits exchange of first data between the first network terminal and at least one of the one or more routing devices; and the first QoS characteristics are associated with the first QoS indicator; and creating the second specialized flow having second QoS characteristics in response to the second setup message, wherein: the second specialized flow permits exchange of second data between the second network terminal and at least one of the one or more routing devices; and the second QoS characteristics are associated with the second QoS indicator.

F: The system according to paragraph E, further comprising a QoS controller, wherein: the second operations comprise: creating the first specialized flow at least partly by sending a first configuration message to the QoS controller; and creating the second specialized flow at least partly by sending a second configuration message to the QoS controller; and the QoS controller is configured to perform third operations comprising: in response to the first configuration message, directing at least one of the one or more routing devices to reserve network resources for the first specialized flow based on the first QoS characteristics; receiving the second configuration message; and in response to the second configuration message, directing at least one of the one or more routing devices to reserve network resources for the second specialized flow based on the second QoS characteristics.

G: The system according to any of paragraphs A-F, wherein the first communication channel is communicatively connected with the second communication channel.

H: The system according to any of paragraphs A-G, wherein the first request comprises identification (408) of the first communication channel, and the identification (408) is not an identifier of a party reachable via VoLTE or ViLTE from the server (304).

I: The system according to any of paragraphs A-H, wherein the first request comprises identification (408) of the first communication channel, and the identification (408) is not an identifier of a party reachable via VoLTE or ViLTE from the first network terminal (102, 202, 302).

J: A method comprising, by a network control device: receiving, via a communications interface from a first network terminal, a first request to create a first specialized flow in a Third-Generation Partnership Project Fifth-Generation New Radio (NR) access network, wherein the first request indicates a user and the first specialized flow is not associated with an Internet Protocol (IP) Multimedia Subsystem (IMS); determining that the user is authorized to create the first specialized flow; and in response, sending, via the communications interface, a first setup message requesting creation of the first specialized flow, the first setup message comprising a first Quality of Service (QoS) indicator associated with the first request.

K: The method according to paragraph J, wherein: the first request is a creation request for a Protocol Data Unit (PDU) session; and the first setup message requests creation of the first specialized flow as the default QoS flow in the PDU session.

L: The method according to paragraph J or K, wherein: the first request identifies a channel and a first media type; and the method further comprises, by the network control device: receiving, from the communications interface from a second network terminal, a second request to create a second specialized flow in an NR access network, wherein: the second request identifies the channel; the second request indicates a second user; the second request indicates a second media type; and the second media type is different from the first media type; determining that the second user is authorized to create the second specialized flow; and in response, sending, via the communications interface, a second setup message requesting creation of the second specialized flow, the second setup message comprising a second QoS indicator associated with the second media type.

M: The method according to paragraph L, further comprising, by the network control device: determining that the first specialized flow has been terminated; and in response, terminating the second specialized flow.

N: The method according to any of paragraphs J-M, further comprising, by the network control device: in response to the first request, establishing a first session associated with the first specialized flow; after sending the first setup message, receiving a first termination request; and in response to the first termination request: terminating the first session; and sending, via the communications interface, a first teardown message requesting removal of the first specialized flow.

O: The method according to any of paragraphs J-N, wherein: the first request indicates a first media type; and the method further comprises, by the network control device: determining a packet filter based at least in part on the first media type; and determining the first setup message comprising the packet filter, wherein the packet filter is associated with the first specialized flow.

P: The method according to any of paragraphs J-O, further comprising, by the network control device, determining the first setup message further comprising a differentiated services indicator associated with the first specialized flow.

Q: The method according to any of paragraphs J-P, further comprising, by the network control device: retrieving permission information associated with at least one of: the user or the first specialized flow; and determining that the permission information indicates that the user is authorized to create the first specialized flow.

R: A network terminal, comprising: a wireless communications interface; at least one processor; and at least one computer-readable medium storing instructions executable by the at least one processor to cause the at least one processor to perform operations comprising: receiving network-address information via the wireless communications interface; determining a network resource associated with the network-address information; sending a flow-request message via the wireless communications interface, wherein: the flow-request message indicates the network resource; the flow-request message indicates a media type; the media type is not an audio media type; and the media type is not a video media type; receiving a success message in response to the flow-request message; and after receiving the success message, exchanging data using the network resource via the wireless communications interface.

S: The network terminal according to paragraph R, wherein the flow-request message comprises at least: a Session Initiation Protocol (SIP) INVITE request; or a Third-Generation Partnership Project Fifth-Generation New Radio (NR) Non-Access Stratum (NAS) N2 PDU Session Request message.

T: The network terminal according to paragraph R or S, the operations further comprising: receiving, after sending the flow-request message and via the wireless communications interface, a packet filter indicating a specialized flow associated with the wireless communications interface; and sending at least some of the data via the specialized flow in response to the packet filter, wherein the packet filter at least partly indicates the network resource.

U: The network terminal according to any of paragraphs R-T, the operations further comprising, before receiving the network-address information: sending, via the wireless communications interface, a first message requesting a first Protocol Data Unit (PDU) session associated with an Internet Protocol (IP) Multimedia Subsystem (IMS) Data Network Name (DNN); and sending, via the wireless communications interface, a second message requesting a second PDU session associated with a DNN different from the IMS DNN.

V: The network terminal according to paragraph U, the second message requesting Session and Service Continuity (SSC) mode three.

W: The network terminal according to paragraph U or V, further comprising: sending the flow-request message via the first PDU session; and receiving the network-address information associated with the second PDU session.

X: Any of the above, wherein the network node comprises at least one of: a user-plane function (UPF), a policy and charging function (PCF), or a proxy call session control function (P-CSCF).

Y: Any of the above, wherein the first bearer comprises an NR data radio bearer (DRB).

Z: As in any of paragraphs A-I, further including the features of paragraph M.

AA: As in any of paragraphs R-W, further including the features of paragraph M.

AB: Any of the above, wherein the specialized flow(s) are assigned to 5QI(s) between 1 and 4, or to 5QIs having priority levels within the range of priority levels spanned by 5QIs 1-4.

AC: A device comprising: a processor; and a computer-readable medium, e.g., a computer storage medium, having thereon computer-executable instructions, the computer-executable instructions upon execution by the processor configuring the device to perform operations as any of paragraphs A-I, J-Q, R-W, X, Y, Z, AA, or AB recites.

AD: A system comprising: a telecommunication device as recited in any of paragraphs A-I, J-Q, R-W, X, Y, Z, AA, or AB, and a control node configured to perform acts as recited in any of paragraphs A-I, J-Q, R-W, X, Y, Z, AA, or AB.

AE: A computer-readable medium, e.g., a computer storage medium, having thereon computer-executable instructions, the computer-executable instructions upon execution configuring a computer to perform operations as any of paragraphs A-I, J-Q, R-W, X, Y, Z, AA, or AB recites.

AF: A device comprising: a processor; and a computer-readable medium, e.g., a computer storage medium, having thereon computer-executable instructions, the computer-executable instructions upon execution by the processor configuring the device to perform operations as any of paragraphs A-I, J-Q, R-W, X, Y, Z, AA, or AB recites.

AG: A system comprising: means for processing; and means for storing having thereon computer-executable instructions, the computer-executable instructions including means to configure the system to carry out a method as any of paragraphs A-I, J-Q, R-W, X, Y, Z, AA, or AB recites.

AH: A network control device configured to perform operations as any of paragraphs J-Q, R-W, X, Y, Z, AA, or AB recites.

AI: A method comprising performing operations as any of paragraphs A-I, J-Q, R-W, X, Y, Z, AA, or AB recites.

AJ: As in any of A-I, further including the features of any of J-Q.

AK: As in any of A-I or AJ, further including the features of any of R-AB.

AL: As in any of J-Q, further including the features of any of A-I or R-AB.

AM: At least one of A-I, at least one of J-Q, and at least one of R-AB.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A system, comprising a control device configured to perform first operations, wherein:
the first operations comprise:
receiving, from a first network terminal, a first request to create a first specialized flow, the first request identifying a first communication channel;
making a first determination that the first request indicates a first predetermined media type, wherein:
the first predetermined media type is not an audio media type; and
the first predetermined media type is not a video media type;
making a second determination that the first request is associated with a first authorized user;
sending, in response to the first determination and to the second determination, a first setup message, wherein:
the first setup message requests establishment of the first specialized flow; and
the first setup message comprises a first Quality of Service (QoS) indicator; and
sending, to the first network terminal, a first completion message indicating establishment of the first specialized flow; and
the first operations further comprise:
receiving, from a second network terminal, a second request to create a second specialized flow, the second request identifying a second communication channel;
making a third determination that the second request indicates a second predetermined media type, wherein:
the second predetermined media type is not an audio media type; and
the second predetermined media type is not a video media type;
making a fourth determination that the second request is associated with a second authorized user;
sending, in response to the third determination and to the fourth determination, a second setup message, wherein:
the second setup message requests establishment of the second specialized flow; and
the second setup message comprises a second QoS indicator; and
sending, to the second network terminal, a second completion message indicating establishment of the second specialized flow.

2. The system according to claim 1, wherein the control device comprises at least one of a Session Management Function (SMF) or a Proxy Call Session Control Function (P-CSCF).

3. The system according to claim 1, further comprising one or more routing devices, wherein the one or more routing devices are configured to convey traffic between the first specialized flow and the second specialized flow.

4. The system according to claim 3, wherein:
the one or more routing devices comprise a first routing device and a second, different routing device;
the first routing device is configured to:
receive a first packet from the first network terminal;
determine a second packet based at least in part on the first packet, the second packet comprising a differentiated-services indicator associated with the first QoS characteristics; and
send the second packet to the second routing device; and
the second routing device is configured to:
receive the second packet;
determine a third packet based at least in part on the second packet; and
send the third packet to the second network terminal.

5. The system according to claim 3, wherein:
the control device is a control device of an application network; and
the system further comprises a policy-management device configured to perform second operations comprising:
creating the first specialized flow having first QoS characteristics in response to the first setup message, wherein:
the first specialized flow permits exchange of first data between the first network terminal and at least one of the one or more routing devices; and
the first QoS characteristics are associated with the first QoS indicator; and
creating the second specialized flow having second QoS characteristics in response to the second setup message, wherein:
the second specialized flow permits exchange of second data between the second network terminal and at least one of the one or more routing devices; and
the second QoS characteristics are associated with the second QoS indicator.

6. The system according to claim 5, further comprising a QoS controller, wherein:
the second operations comprise:
creating the first specialized flow at least partly by sending a first configuration message to the QoS controller; and
creating the second specialized flow at least partly by sending a second configuration message to the QoS controller; and
the QoS controller is configured to perform third operations comprising:
in response to the first configuration message, directing at least one of the one or more routing devices to reserve network resources for the first specialized flow based on the first QoS characteristics;
receiving the second configuration message; and
in response to the second configuration message, directing at least one of the one or more routing devices to reserve network resources for the second specialized flow based on the second QoS characteristics.

7. A method comprising, by a network control device:
receiving, via a communications interface from a first network terminal, a first request to create a first specialized flow in a Third-Generation Partnership Project Fifth-Generation New Radio (NR) access network, wherein the first request indicates a user and identifies a channel and a first media type, and the first specialized flow is not associated with an Internet Protocol (IP) Multimedia Subsystem (IMS);
determining that the user is authorized to create the first specialized flow;
in response, sending, via the communications interface, a first setup message requesting creation of the first specialized flow, the first setup message comprising a first Quality of Service (QoS) indicator associated with the first request;

receiving, from the communications interface from a second network terminal, a second request to create a second specialized flow in an NR access network, wherein:
the second request identifies the channel;
the second request indicates a second user;
the second request indicates a second media type; and
the second media type is different from the first media type;

determining that the second user is authorized to create the second specialized flow; and in response, sending, via the communications interface, a second setup message requesting creation of the second specialized flow, the second setup message comprising a second QoS indicator associated with the second media type.

8. The method according to claim 7, wherein:
the first request is a creation request for a Protocol Data Unit (PDU) session; and
the first setup message requests creation of the first specialized flow as the default QoS flow in the PDU session.

9. The method according to claim 7, further comprising, by the network control device:
determining that the first specialized flow has been terminated; and
in response, terminating the second specialized flow.

10. The method according to claim 7, further comprising, by the network control device:
in response to the first request, establishing a first session associated with the first specialized flow;
after sending the first setup message, receiving a first termination request; and
in response to the first termination request:
terminating the first session; and
sending, via the communications interface, a first teardown message requesting removal of the first specialized flow.

11. The method according to claim 7, wherein:
the method further comprises, by the network control device:
determining a packet filter based at least in part on the first media type; and
determining the first setup message comprising the packet filter,
wherein the packet filter is associated with the first specialized flow.

12. The method according to claim 7, further comprising, by the network control device, determining the first setup message further comprising a differentiated services indicator associated with the first specialized flow.

13. The method according to claim 7, further comprising, by the network control device:
retrieving permission information associated with at least one of: the user or the first specialized flow; and
determining that the permission information indicates that the user is authorized to create the first specialized flow.

14. A network terminal, comprising:
a wireless communications interface;
at least one processor; and
at least one computer-readable medium storing instructions executable by the at least one processor to cause the at least one processor to perform operations comprising:
receiving network-address information via the wireless communications interface;
determining a network resource associated with the network-address information;
sending a flow-request message via the wireless communications interface, wherein:
the flow-request message indicates the network resource;
the flow-request message indicates a media type;
the media type is not an audio media type; and
the media type is not a video media type;
receiving a success message in response to the flow-request message; and
after receiving the success message, exchanging data using the network resource via the wireless communications interface.

15. The network terminal according to claim 14, wherein the flow-request message comprises at least:
a Session Initiation Protocol (SIP) INVITE request; or
a Third-Generation Partnership Project Fifth-Generation New Radio (NR) Non-Access Stratum (NAS) N2 PDU Session Request message.

16. The network terminal according to claim 14, the operations further comprising:
receiving, after sending the flow-request message and via the wireless communications interface, a packet filter indicating a specialized flow associated with the wireless communications interface; and
sending at least some of the data via the specialized flow in response to the packet filter,
wherein the packet filter at least partly indicates the network resource.

17. The network terminal according to claim 14, the operations further comprising, before receiving the network-address information:
sending, via the wireless communications interface, a first message requesting a first Protocol Data Unit (PDU) session associated with an Internet Protocol (IP) Multimedia Subsystem (IMS) Data Network Name (DNN); and
sending, via the wireless communications interface, a second message requesting a second PDU session associated with a DNN different from the IMS DNN.

18. The network terminal according to claim 17, the second message requesting Session and Service Continuity (SSC) mode three.

19. The network terminal according to claim 17, further comprising:
sending the flow-request message via the first PDU session; and
receiving the network-address information associated with the second PDU session.

* * * * *